US012651569B2

(12) United States Patent
Chun et al.

(10) Patent No.: US 12,651,569 B2
(45) Date of Patent: Jun. 9, 2026

(54) PIXEL AND DISPLAY APPARATUS HAVING THE SAME

(71) Applicant: SAMSUNG DISPLAY CO., LTD., Yongin-si (KR)

(72) Inventors: Byung Ki Chun, Yongin-si (KR); Boodong Kwak, Yongin-si (KR); Junghwan Cho, Yongin-si (KR); Yongseok Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 6 days.

(21) Appl. No.: 18/766,862

(22) Filed: Jul. 9, 2024

(65) Prior Publication Data

US 2025/0022418 A1 Jan. 16, 2025

(30) Foreign Application Priority Data

Jul. 10, 2023 (KR) ........................ 10-2023-0088913

(51) Int. Cl.
*G09G 3/3233* (2016.01)
*G09G 3/32* (2016.01)
(Continued)

(52) U.S. Cl.
CPC ............. *G09G 3/3233* (2013.01); *G09G 3/32* (2013.01); *G09G 3/3266* (2013.01);
(Continued)

(58) Field of Classification Search
CPC ...... G09G 3/3233; G09G 3/32; G09G 3/3208; G09G 3/3266; G09G 3/3607; G09G 3/3225; G09G 3/2003; G09G 3/003; G09G 3/3648; G09G 3/3291; G09G 2320/028; G09G 2320/068; G09G 2320/0233;
(Continued)

(56) References Cited

U.S. PATENT DOCUMENTS

2024/0005873 A1* 1/2024 Kim ..................... G09G 3/3266
2024/0257769 A1* 8/2024 Kim ..................... H10K 59/879

FOREIGN PATENT DOCUMENTS

KR 10-1226226 1/2013
KR 10-1639977 7/2016
(Continued)

*Primary Examiner* — Dong Hui Liang
(74) *Attorney, Agent, or Firm* — F. CHAU & ASSOCIATES, LLC

(57) ABSTRACT

A pixel includes first and second subpixels. The first subpixel includes a first light emitting element, a first transistor configured to drive the first light emitting element, a second transistor configured to apply a data voltage to the first transistor in response to a first write gate signal and a fifth transistor configured to apply a power supply voltage to the first transistor in response to an emission signal. The second subpixel includes a second light emitting element having a viewing angle different from the first light emitting element, a sixth transistor configured to drive the second light emitting element, a seventh transistor configured to apply the data voltage to the sixth transistor in response to a second write gate signal different from the first write gate signal and a tenth transistor configured to apply the power supply voltage to the sixth transistor in response to the emission signal.

21 Claims, 9 Drawing Sheets

(51) Int. Cl.
*G09G 3/3266* (2016.01)
*G09G 3/3291* (2016.01)

(52) U.S. Cl.
CPC ... *G09G 3/3291* (2013.01); *G09G 2310/0267* (2013.01); *G09G 2310/0275* (2013.01); *G09G 2310/08* (2013.01); *G09G 2320/028* (2013.01)

(58) Field of Classification Search
CPC ..... G09G 2320/043; G09G 2320/0242; G09G 2320/0626; G09G 2320/0285; G09G 2320/045; G09G 2320/0666; G09G 2320/0693; G09G 2300/0426; G09G 2300/0842; G09G 2300/0452; G09G 2300/0861; G09G 2300/0439; G09G 2300/0819; G09G 2300/0443; G09G 2300/0465; G09G 2358/00; G09G 2321/0267; G09G 2330/021; G09G 2354/00
See application file for complete search history.

(56) References Cited

FOREIGN PATENT DOCUMENTS

| | | |
|---|---|---|
| KR | 10-2018-0047275 | 5/2018 |
| KR | 10-2021-0069152 | 6/2021 |
| KR | 10-2022-0091273 | 6/2022 |

* cited by examiner

PIXEL AND DISPLAY APPARATUS HAVING THE SAME

CROSS-REFERENCE TO RELATED APPLICATION

This patent application claims priority under 35 USC § 119 to Korean Patent Application No. 10-2023-0088913 filed on Jul. 10, 2023 in the Korean Intellectual Property Office (KIPO), the disclosure of which is incorporated by reference in its entirety herein.

1. TECHNICAL FIELD

Embodiments of the present inventive concept are directed to a display apparatus. More particularly, embodiments of the present inventive concept are directed to a pixel and a display apparatus including the pixel.

2. DISCUSSION OF RELATED ART

A display apparatus may include a display panel and a panel driver to drive the display panel. The display panel may include a plurality of gate lines, a plurality of data lines, a plurality of emission lines, and a plurality of pixels. The panel driver may include a gate driver configured to provide gate signals to the gate lines, a data driver configured to provide data voltages to the data lines, an emission driver configured to provide emission signals to the emission lines, and a driving controller configured to control the gate driver, the data driver, and the emission driver.

A display apparatus that supports a public mode and a private mode has been recently developed. The display apparatus may include public mode pixels for the public mode and private mode pixels for the private mode. Images during the private mode may be viewable by an authorized viewer but more difficult to view by non-authorized viewers. Images during the public mode may be viewable by all viewers. However, since areas of the public mode pixels and the private mode pixels are fixed, there may be cases where non-authorized viewers are able to view images during the private mode. Further, luminance degradation may occur due to the presence of both public and private mode pixels.

SUMMARY

At least one embodiment of the present inventive concept provides a pixel of a display panel in which a public mode area and a private mode are dynamically set according to image data.

At least one embodiment of the present inventive concept also provide a display apparatus including the pixel.

In an embodiment according to the present inventive concept, a pixel includes first and second subpixels. The first subpixel includes a first light emitting element, a first transistor configured to apply a first driving current to the first light emitting element, a second transistor configured to apply a data voltage to the first transistor in response to a first write gate signal and a fifth transistor configured to apply a first power supply voltage to the first transistor in response to an emission signal. The second subpixel includes a second light emitting element having a viewing angle different from a viewing angle of the first light emitting element, a sixth transistor configured to apply a second driving current to the second light emitting element, a seventh transistor configured to apply the data voltage to the sixth transistor in response to a second write gate signal different from the first write gate signal and a tenth transistor configured to apply the first power supply voltage to the sixth transistor in response to the emission signal.

In an embodiment, the first subpixel may be a private mode subpixel having a first viewing angle, and the second subpixel may be a public mode subpixel having a second viewing angle wider than the first viewing angle.

In an embodiment, the second transistor may be turned off and the seventh transistor may be turned on in an odd-numbered frame period.

In an embodiment, the second transistor may be turned on and the seventh transistor may be turned off in an even-numbered frame period.

In an embodiment, the first subpixel may comprise the first transistor including a first control electrode connected to a first node, a second control electrode connected to a third node, a first electrode connected to a second node and a second electrode connected to the third node, the second transistor including a control electrode configured to receive the first write gate signal, a first electrode configured to receive the data voltage and a second electrode connected to the first node, a third transistor including a control electrode configured to receive a control gate signal, a first electrode configured to receive a reference voltage and a second electrode connected to the first node, a fourth transistor including a control electrode configured to receive an initialization gate signal, a first electrode configured to receive an initialization voltage and a second electrode connected to the third node, a first storage capacitor including a first electrode connected to the third node and a second electrode connected to the first node, a first holding capacitor including a first electrode configured to receive the first power supply voltage and a second electrode connected to the third node and the first light emitting element and the second subpixel may comprise the sixth transistor including a first control electrode connected to a fourth node, a second control electrode connected to a sixth node, a first electrode connected to a fifth node and a second electrode connected to the sixth node, the seventh transistor including a control electrode configured to receive the second write gate signal, a first electrode configured to receive the data voltage and a second electrode connected to the fourth node, an eighth transistor including a control electrode configured to receive the control gate signal, a first electrode configured to receive the reference voltage and a second electrode connected to the fourth node, a ninth transistor including a control electrode configured to receive the initialization gate signal, a first electrode configured to receive the initialization voltage and a second electrode connected to the sixth node, a tenth transistor including a control electrode configured to receive the emission signal, a first electrode configured to receive the first power supply voltage and a second electrode connected to the fifth node, a second storage capacitor including a first electrode connected to the sixth node and a second electrode connected to the fourth node, a second holding capacitor including a first electrode configured to receive the first power supply voltage and a second electrode connected to the sixth node and the second light emitting element.

In an embodiment, an odd-numbered frame period of the pixel may comprise an odd frame initialization period in which the emission signal has an inactivation level, the control gate signal has an activation level, the initialization gate signal has an activation level, the first write gate signal has an inactivation level and the second write gate signal has an inactivation level, an odd frame compensation period in which the emission signal has an activation level, the control gate signal has an activation level, the initialization gate signal has an inactivation level, the first write gate signal has an inactivation level and the second write gate signal has an inactivation level, an odd frame writing period in which the emission signal has an inactivation level, the control gate signal has an inactivation level, the initialization gate signal has an inactivation level, the first write gate signal has an inactivation level and the second write gate signal has an activation level and an odd frame emitting period in which the emission signal has an activation level, the control gate signal has an inactivation level, the initialization gate signal has an inactivation level, the first write gate signal has an inactivation level and the second write gate signal has an inactivation level and an even-numbered frame period of the pixel may comprise an even frame initialization period in which the emission signal has an inactivation level, the control gate signal has an activation level, the initialization gate signal has an activation level, the first write gate signal has an inactivation level and the second write gate signal has an inactivation level, an even frame compensation period in which the emission signal has an activation level, the control gate signal has an activation level, the initialization gate signal has an inactivation level, the first write gate signal has an inactivation level and the second write gate signal has an inactivation level, an even frame writing period in which the emission signal has an inactivation level, the control gate signal has an inactivation level, the initialization gate signal has an inactivation level, the first write gate signal has an activation level and the second write gate signal has an inactivation level and an even frame emitting period in which the emission signal has an activation level, the control gate signal has an inactivation level, the initialization gate signal has an inactivation level, the first write gate signal has an inactivation level and the second write gate signal has an inactivation level.

In an embodiment according to the present inventive concept, a display apparatus comprises a display panel, a data driver, a gate driver, an emission driver and a driving controller. The display panel includes a first subpixel, and a second subpixel having a viewing angle different from a viewing angle of the first subpixel. The data driver is configured to apply a data voltage and a reference voltage to the display panel. The gate driver is configured to apply a control gate signal, an initialization gate signal, a first write gate signal and a second write gate signal to the display panel. The emission driver is configured to apply emission signals to the display panel. The driving controller is configured to control the data driver, the gate driver and the emission driver. The first subpixel and the second subpixel are configured to receive a same one of the emission signals.

In an embodiment, the first subpixel may be a private mode subpixel having a first viewing angle and wherein the second subpixel may be a public mode subpixel having a second viewing angle wider than the first viewing angle.

In an embodiment, a data writing operation may not be performed on the first subpixel in an odd frame writing period of an odd-numbered frame period and the data writing operation may not be performed on the second subpixel in the odd frame writing period.

In an embodiment, in an odd frame emitting period of the odd numbered frame period, the first subpixel may emit light based on previous even frame data and the second subpixel may emit light based on current odd frame data.

In an embodiment, an initialization operation may not be performed on the first subpixel in an odd frame initialization period of the odd-numbered frame period, and a compensation operation may not be performed on the first subpixel in an odd frame compensation period of the odd-numbered frame period.

In an embodiment, in the odd frame emitting period, the first subpixel may not emit light and the second subpixel may emit light based on present odd frame data.

In an embodiment, a data writing operation may not be performed on the second subpixel in an even frame writing period of an even-numbered frame period and the data writing operation may be performed on the first subpixel in an even frame writing period of the even-numbered frame period.

In an embodiment, in the even frame emitting period, the second subpixel may emit light based on a previous odd frame data and the first subpixel may emit light based on a current even frame data.

In an embodiment, an initialization operation may be performed on the second subpixel in an even frame initialization period of the even-numbered frame period, and a compensation operation may be performed on the second subpixel in an even frame compensation period In an embodiment, in the even frame emitting period, the second subpixel may not emit light and the first subpixel may emit light based on a current even frame data of the even-numbered frame period.

In an embodiment, the display apparatus may operate in a private mode or a public mode, when in the private mode, a data writing operation may not be performed on the second subpixel in the frame period.

In an embodiment, the data driver may apply a first data voltage and a first reference voltage to the first subpixel, and the data driver may apply a second data voltage different from the first data voltage and a second reference voltage different from the first reference voltage to the second subpixel.

In an embodiment, the first subpixel may comprise a first light emitting element, a first transistor configured to apply a first driving current to the first light emitting element, a second transistor configured to apply a data voltage to the first transistor in response to a first write gate signal and a fifth transistor configured to apply a first power supply voltage to the first transistor in response to an emission signal and the second subpixel including a second light emitting element having a viewing angle different from a viewing angle of the first light emitting element, a sixth transistor configured to apply a second driving current to the second light emitting element, a seventh transistor configured to apply the data voltage to the sixth transistor in response to a second write gate signal different from the first write gate signal and a tenth transistor configured to apply the first power supply voltage to the sixth transistor in response to the emission signal.

In an embodiment, the first subpixel may comprise the first transistor including a first control electrode connected to a first node, a second control electrode connected to a third node, a first electrode connected to a second node and a second electrode connected to the third node, the second transistor including a control electrode configured to receive the first write gate signal, a first electrode configured to receive the data voltage and a second electrode connected to the first node, a third transistor including a control electrode configured to receive a control gate signal, a first electrode configured to receive a reference voltage and a second electrode connected to the first node, a fourth transistor including a control electrode configured to receive an initialization gate signal, a first electrode configured to receive an initialization voltage and a second electrode connected to the third node, a first storage capacitor including a first electrode connected to the third node and a second electrode connected to the first node, a first holding capacitor including a first electrode configured to receive the first power supply voltage and a second electrode connected to the third node and the first light emitting element, and the second subpixel may comprise the sixth transistor including a first control electrode connected to a fourth node, a second control electrode connected to a sixth node, a first electrode connected to a fifth node and a second electrode connected to the sixth node, the seventh transistor including a control electrode configured to receive the second write gate signal, a first electrode configured to receive the data voltage and a second electrode connected to the fourth node, an eighth transistor including a control electrode configured to receive the control gate signal, a first electrode configured to receive the reference voltage and a second electrode connected to the fourth node, a ninth transistor including a control electrode configured to receive the initialization gate signal, a first electrode configured to receive the initialization voltage and a second electrode connected to the sixth node, a tenth transistor including a control electrode configured to receive the emission signal, a first electrode configured to receive the first power supply voltage and a second electrode connected to the fifth node, a second storage capacitor including a first electrode connected to the sixth node and a second electrode connected to the fourth node, a second holding capacitor including a first electrode configured to receive the first power supply voltage and a second electrode connected to the sixth node and the second light emitting element.

As described above, a pixel or pixel circuit according to embodiments may include a first subpixel and a second subpixel, and different write gate signals may be applied to the first subpixel and the second subpixel, so that each of the subpixels may be a public mode subpixel or a private mode subpixel. Since the write gate signal may be applied to the subpixels according to image data and the same emission signal may be applied to the subpixels, a public mode area and a private mode area may be arbitrarily disposed on the display panel of the display apparatus. Accordingly, the positions where the public mode area and the private mode area are displayed on the display panel of the display apparatus may be dynamically changed according to the image data.

In an embodiment according to the present inventive concept, a display apparatus includes a display panel, a gate driver, and an emission driver. The display panel includes a plurality of pixels, where each of the pixels comprises a first subpixel and a second subpixel. The gate driver is configured to generate a first write gate signal and a second write gate different from the first write gate signal. The emission driver is configured to apply a plurality of emission signals to the display panel. The first subpixel includes a first light emitting element having a first viewing angle, a first driving transistor, a first data write transistor configured to apply a data voltage to the first driving transistor in response to the first write gate signal, and a first emission control transistor configured to apply a power supply voltage to the first driving transistor in response to a first emission signal among the emission signals. The second subpixel includes a second light emitting element having a second viewing angle different from the first viewing angle, a second driving transistor configured to apply a second driving current to the second light emitting element, a second data write transistor configured to apply the data voltage to the second driving transistor in response to the second write gate signal, and an emission control transistor configured to apply the power supply voltage to the second driving transistor in response to the first emission signal.

Additionally, since the public mode subpixel and the private mode subpixel may emit light in the entire frame period, luminance degradation may be prevented.

BRIEF DESCRIPTION OF THE DRAWINGS

The above and other features of the present inventive concept will become more apparent by describing in detailed embodiments thereof with reference to the accompanying drawings, in which.

DETAILED DESCRIPTION

Hereinafter, the present inventive concept will be described in more detail with reference to the accompanying drawings.

Figure 1:
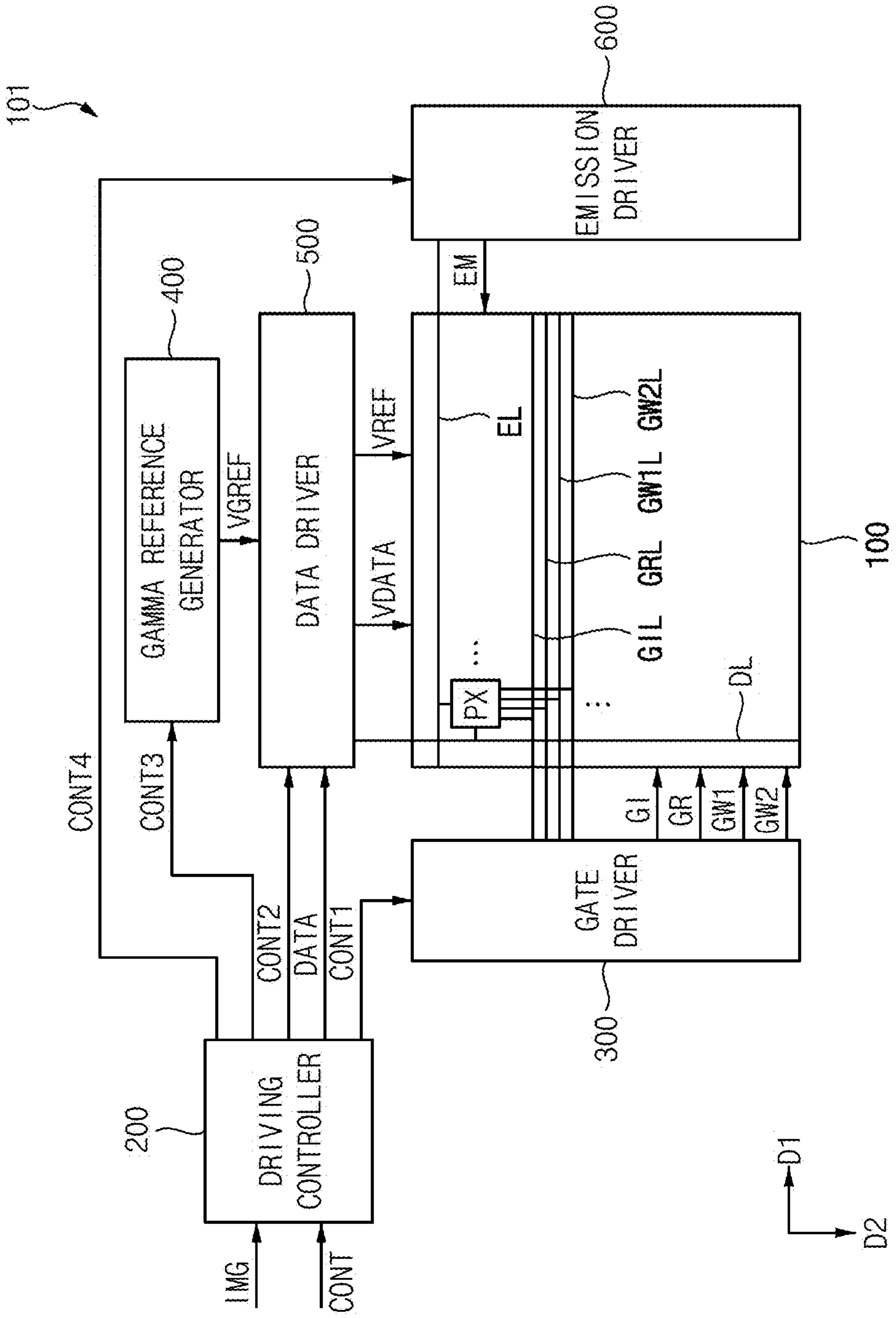
FIG. 1 is a block diagram illustrating a display apparatus according to an embodiment of the present inventive concept.

FIG. 1 is a block diagram illustrating a display apparatus 101 according to an embodiment of the present inventive concept.

Referring to FIG. 1, the display apparatus may include a display panel 100 and a display panel driver (e.g., a panel driver circuit). The display panel driver may include a driving controller 200 (e.g., a control circuit), a gate driver 300 (e.g., a first driver circuit), a gamma reference voltage generator 400, a data driver 500 (e.g., a second driver circuit), and an emission driver 600 (e.g., a third driver circuit).

The display panel 100 may include a display part configured to display an image, and a peripheral part that is adjacent to the display part.

The display panel 100 may include a plurality of gate lines GIL, GRL, GW1L, GW2L, a plurality of data lines DL, a plurality of emission lines EL and a plurality of pixel PX electrically connected to the gate lines GIL, GRL, GW1L, GW2L, and the data lines DL respectively. The gate lines GIL, GRL, GW1L, GW2L may extend in a first direction D1, the data lines DL may extend in a second direction D2 crossing the first direction D1 and the emission lines EL may extend in the first direction D1.

The driving controller 200 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3, an emission control signal CONT4 and a data signal DATA based on the input image data IMG and the input control signal CONT.

The driving controller 200 may generate the gate control signal CONT1 for controlling an operation of the gate driver 300 based on the input control signal CONT to output the generated gate control signal CONT1 to the gate driver 300. The gate control signal CONT1 may include a vertical start signal and a gate clock signal.

The driving controller 200 may generate the data control signal CONT2 for controlling an operation of the data driver 500 based on the input control signal CONT to output the generated data control signal CONT2 to the data driver 500. The data control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the gamma control signal CONT3 for controlling an operation of the gamma reference voltage generator 400 based on the input control signal CONT to output the generated gamma control signal CONT3 to the gamma reference voltage generator 400.

The driving controller 200 may generate the emission control signal CONT4 for controlling an operation of the emission driver 600 based on the input control signal CONT to output the generated emission control signal CONT4 to the emission driver 600.

The gate driver 300 may generate gate signals GI, GR, GW1, GW2 for driving the gate lines GIL, GRL, GW1L, GW2L in response to the gate control signal CONT1 received from the driving controller 200. The gate driver 300 may output the gate signals GI, GR, GW1, GW2 to the gate lines GIL, GRL, GW1L, GW2L. For example, the gate driver 300 may sequentially output the gate signals GI, GR, GW1, GW2 to the gate lines GIL, GRL, GW1L, GW2L. The gate signals GI, GR, GW1, GW2 may include an initialization gate signal GI, a control gate signal GR, a first write gate signal GW1 and a second write gate signal GW2.

For example, the gate driver 300 may be mounted on the peripheral region of the display panel. For example, the gate driver 300 may be integrated on the peripheral region of the display panel.

The gamma reference voltage generator 400 may generate a gamma reference voltage VGREF in response to the gamma control signal CONT3 received from the driving controller 200. The gamma reference voltage generator 400 may provide the gamma reference voltage VGREF to the data driver 500.

In an embodiment, the gamma reference voltage generator 400 may be disposed in the driving controller 200, or in the data driver 500.

The data driver 500 may receive the data control signal CONT2 and the data signal DATA from the driving controller 200, and receive the gamma reference voltage VGREF from the gamma reference voltage generator 400. The data driver 500 may convert the data signal DATA into an analog data voltage VDATA by using the gamma reference voltage VGREF. The data driver 500 may output the data voltage VDATA to the data lines DL. The data voltage VDATA may include a reference voltage VREF.

For example, the data driver 500 may be mounted on the peripheral region of the display panel. For example, the data driver 500 may be integrated on the peripheral region of the display panel.

The emission driver 600 may generate emission signals EM for driving the emission lines EL in response to the emission control signal CONT4 received from the driving controller 200. The emission driver 600 may output the emission signals EM to the emission lines EL.

For example, the emission driver 600 may be integrated on the peripheral region of the display panel 100. For example, the emission driver 600 may be mounted on the peripheral region of the display panel 100.

Although it has been illustrated in FIG. 1 that the gate driver 300 is disposed on a first side of the display panel 100, and the emission driver 600 is disposed on a second side of the display panel 100, which is opposite to the first side, embodiments of the present inventive concept is not limited thereto. For example, the gate driver 300 and the emission driver 600 may be disposed on the same side of the display panel 100. For example, the gate driver 300 and the emission driver 600 may be integrated on the peripheral region of the display panel 100 on the same side of the display region of the display panel 100. The gate driver 300 and the emission driver 600 may be formed integrally with each other. For example, a single circuit may be used to implement the driver 300 and the emission driver 600.

Figure 2:
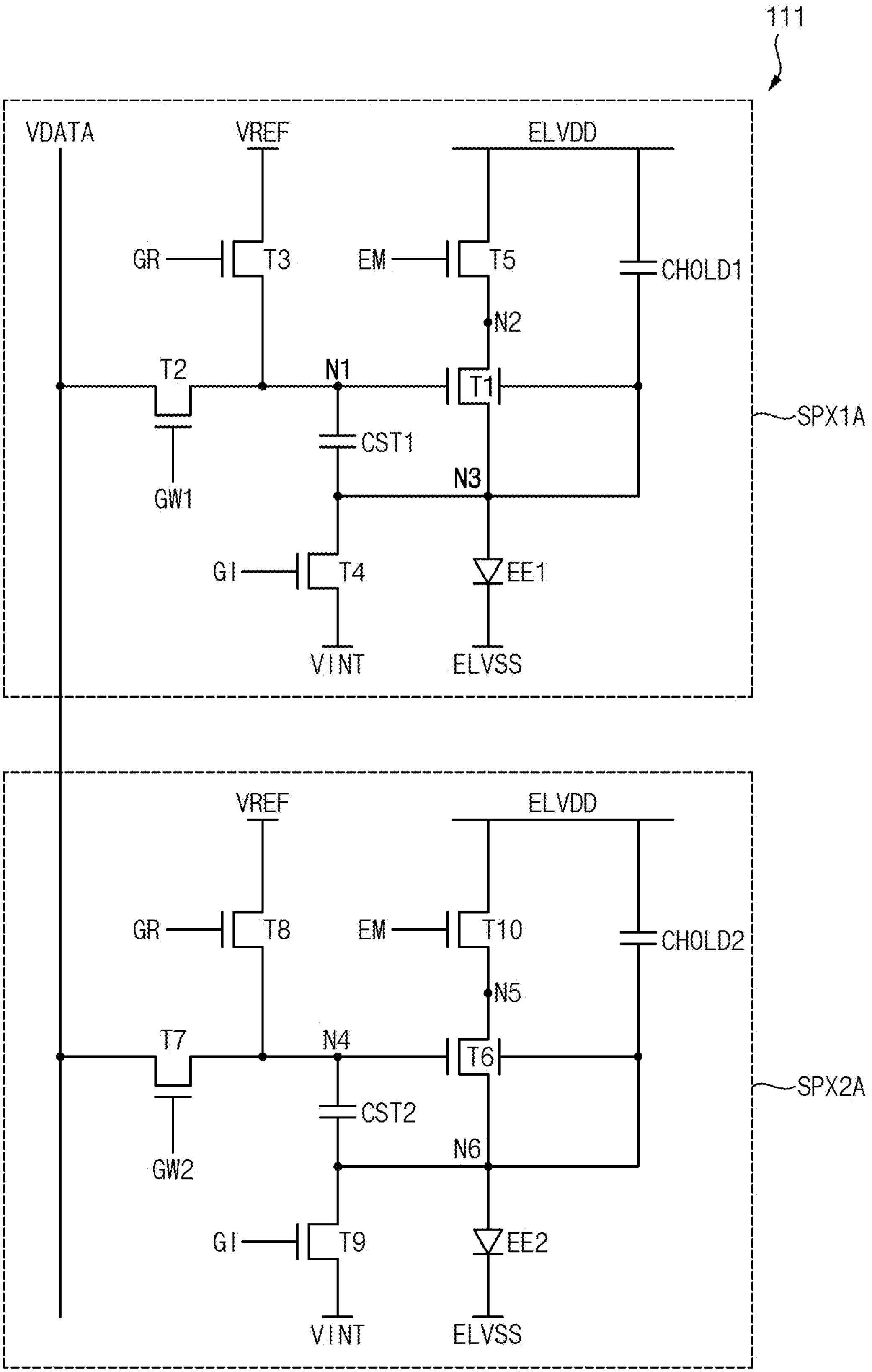
FIG. 2 is a circuit diagram illustrating a pixel circuit of a pixel of the display apparatus of FIG. 1.

FIG. 2 is a circuit diagram illustrating a pixel circuit 111 of a pixel PX of the display apparatus 101 of FIG. 1

Referring to FIG. 1 and FIG. 2, in this embodiment, the pixel circuit 111 includes a first subpixel SPX1A and a second subpixel SPX2A.

The first subpixel SPX1A may include a first transistor T1, a second transistor T2, a third transistor T3, a fourth transistor T4, a fifth transistor T5, a first storage capacitor CST1, a first holding capacitor CHOLD1 and a first light emitting element EE1. In an embodiment, the first transistor T1 has a double-gate structure.

The first transistor T1 may generate a first driving current based on a voltage of a first node N1. For example, the first transistor T1 may be referred to as a driving transistor or a first driving transistor. The first transistor T1 may include a first control electrode connected to the first node N1, a second control electrode connected to a third node N3, a first electrode connected to a second node N2 and a second electrode connected to the third node N3.

The may apply a data voltage VDATA to the first node N1 in response to the first write gate signal GW1. For example, the second transistor T2 may be referred to as a data write transistor or a first data write transistor. The second transistor T2 may include a control electrode (e.g., a gate) configured to receive the first write gate signal GW1, a first electrode configured to receive the data voltage VDATA and a second electrode connected to the first node N1. For example, an operation in which the data voltage VDATA is applied to the first node N1 in response to the second transistor T2 may be referred to as a data writing operation or a first data writing operation.

The third transistor T3 may apply the reference voltage VREF to the first node N1 in response to the control gate signal GR. For example, the third transistor T3 may be referred to as a reference voltage write transistor. The third transistor T3 may include a control electrode configured to receive the control gate signal GR, a first electrode configured to receive the reference voltage VREF and a second electrode connected to the first node N1.

The fourth transistor T4 may apply an initialization voltage VINT to the third node N3 in response to the initialization gate signal GI. For example, the fourth transistor T4 may be referred to as an initialization transistor or a light emitting element initialization transistor. The fourth transistor T4 may include a control electrode configured to receive the initialization gate signal GI, a first electrode configured to receive the initialization voltage VINT and a second electrode connected to the third node N3.

The fifth transistor T5 may apply a first power supply voltage ELVDD (e.g., a high power supply voltage) to the second node N2 in response to the emission signal EM. For example, the fifth transistor T5 may be referred to as an emission control transistor or a first emission control transistor. The fifth transistor T5 may include a control electrode configured to receive the emission signal EM, a first electrode configured to receive the first power supply voltage ELVDD and a second electrode connected to the second node N2.

The first storage capacitor CST1 may apply the data voltage VDATA to the third node N3. The first storage capacitor CST1 may include a first electrode connected to the third node N3 and a second electrode connected to the first node N1.

The first holding capacitor CHOLD1 may apply a compensation data voltage to the third node N3. The first holding capacitor CHOLD1 may include a first electrode configured to receive a power supply voltage ELVDD and a second electrode connected to the third node N3.

The first light emitting element EE1 may emit light based on the driving current generated by the first transistor T1. In an embodiment, the first light emitting element EE1 may be an organic light emitting diode (OLED), but is not limited thereto. In other embodiments, the first light emitting element EE1 may be a nano light emitting diode (NED), a quantum dot (QD) light emitting diode, a micro light emitting diode, an inorganic light emitting diode, or any other suitable light emitting device. The first light emitting element EE1 may include a first electrode (e.g. anode) connected to the third node N3 and a second electrode (e.g. cathode) configured to receive a second power supply voltage ELVSS (e.g., a low power supply voltage).

The second subpixel SPX2A may include a sixth transistor T6, a seventh transistor T7, an eighth transistor T8, a ninth transistor T9, a tenth transistor T10, a second storage capacitor CST2, a second holding capacitor CHOLD2 and a second light emitting element EE1. In an embodiment, the sixth transistor T6 has a double-gate structure.

The sixth transistor T6 may generate a second driving current based on a voltage of a fourth node N4. For example, the sixth transistor T6 may be referred to as a driving transistor or a second driving transistor. The sixth transistor T6 may include a first control electrode connected to the fourth node N4, a second control electrode connected to a sixth node N6, a first electrode connected to a fifth node N5 and a second electrode connected to the sixth node N6.

The seventh transistor T7 may apply a data voltage VDATA to the fourth node N4 in response to the second write gate signal GW2. For example, the seventh transistor T7 may be referred to as a data write transistor or a second data write transistor. The seventh transistor T7 may include a control electrode configured to receive the second write gate signal GW2, a first electrode configured to receive the data voltage VDATA and a second electrode connected to the fourth node N4. For example, an operation in which the data voltage VDATA is applied to the fourth node N4 in response to the seventh transistor T7 may be referred to as a data writing operation or a second data writing operation.

The eighth transistor T8 may apply the reference voltage VREF to the fourth node N4 in response to the control gate signal GR. For example, the eighth transistor T8 may be referred to as a reference voltage write transistor. The eighth transistor T8 may include a control electrode configured to receive the control gate signal GR, a first electrode configured to receive the reference voltage VREF and a second electrode connected to the fourth node N4.

The ninth transistor T9 may apply an initialization voltage VINT to the sixth node N6 in response to the initialization gate signal GI. For example, the ninth transistor T9 may be referred to as an initialization transistor or a light emitting element initialization transistor. The ninth transistor T9 may include a control electrode configured to receive the initialization gate signal GI, a first electrode configured to receive the initialization voltage VINT and a second electrode connected to the sixth node N6.

The tenth transistor T10 may apply the first power supply voltage ELVDD (e.g., the high power supply voltage) to the fifth node N5 in response to the emission signal EM. For example, the tenth transistor T10 may be referred to as an emission control transistor or a second emission control transistor. The tenth transistor T10 may include a control electrode configured to receive the emission signal EM, a first electrode configured to receive the first power supply voltage ELVDD and a second electrode connected to the fifth node N5.

The second storage capacitor CST2 may apply the data voltage VDATA to the sixth node N6. The second storage capacitor CST2 may include a first electrode connected to the sixth node N6 and a second electrode connected to the fourth node N4.

The second holding capacitor CHOLD2 may apply a compensation data voltage to the sixth node N6. The second holding capacitor CHOLD2 may include a first electrode configured to receive the power supply voltage ELVDD and a second electrode connected to the sixth node N6.

The second light emitting element EE2 may emit light based on the driving current generated by the sixth transistor T6. In an embodiment, the second light emitting element EE2 is an organic light emitting diode (OLED), but is not limited thereto. In other embodiments, the second light emitting element EE2 may be a nano light emitting diode (NED), a quantum dot (QD) light emitting diode, a micro light emitting diode, an inorganic light emitting diode, or any other suitable light emitting device. The second light emitting element EE2 may include a first electrode (e.g. anode) connected to the sixth node N6 and a second electrode (e.g. cathode) configured to receive the second power supply voltage ELVSS (e.g. the low power supply voltage).

As such, the first subpixel SPX1A may have a 5T2C structure including five transistors T1, T2, T3, T4, T5 and two capacitors CST1, CHOLD1. The second subpixel SPX2A may have a 5T2C structure including five transistors T6, T7, T8, T9, T10 and two capacitors CST2, CHOLD2. However, the present inventive concept is not limited to subpixels having this number of transistors and capacitors.

Also, the present inventive concept is not limited to the type of transistor illustrated in FIG. 2.

While the first subpixel SPX1A and the second subpixel SPX2A are shown in FIG. 2 as being disposed vertically, the present inventive concept is not limited to this disposition of the first subpixel SPX1A and the second subpixel SPX2A. For example, the first subpixel SPX1A and the second subpixel SPX2A may be disposed horizontally.

In an embodiment, a viewing angle of the second light emitting element EE2 is different from a viewing angle of the first light emitting element EE1. For example, the viewing angle of the first light emitting element EE1 (e.g., a first viewing angle) may be wider than the viewing angle of the second light emitting element EE2 (e.g., a second viewing angle). For example, the viewing angle of the first light emitting element EE1 (e.g., the first viewing angle) may be narrower than the viewing angle of the second light emitting element EE2 (e.g. the second viewing angle). For example, it may be difficult for a viewer outside of a given viewing angle of a given subpixel to perceive images of the given subpixel.

One of the first subpixel SPX1A and the second subpixel SPX2A may be a public mode subpixel, and the other may be a private mode subpixel. While a pixel PX is illustrated as including two subpixels, the present inventive concept is not limited thereto. In an embodiment, when the viewing angle of the second light emitting element EE2 (e.g. the second viewing angle) is wider than the viewing angle of the first light emitting element EE1 (e.g. the first viewing angle), the first subpixel SPX1A is referred to as the private mode subpixel and the second subpixel SPX2A is referred to as the public mode subpixel.

In an embodiment, the first subpixel SPX1A and the second subpixel SPX2A have a same structure and operation, except that the applied write gate signal and a viewing angle of the light emitting element are different. In an embodiment, the emission signal EM applied to the first subpixel SPX1A and the second subpixel SPX2A are the same. Accordingly, a private mode area or a public mode area may be formed locally in any part of the display panel 100 of the display device 101. Further, the size of the private mode area and a public mode area may be dynamically adjusted as needed. For example, if an image of the image data needs to be displayed in the private mode area at a certain location and in an area of certain size, the size and location of the private mode area can be configured by activating a corresponding number of private mode subpixels.

Figure 3:
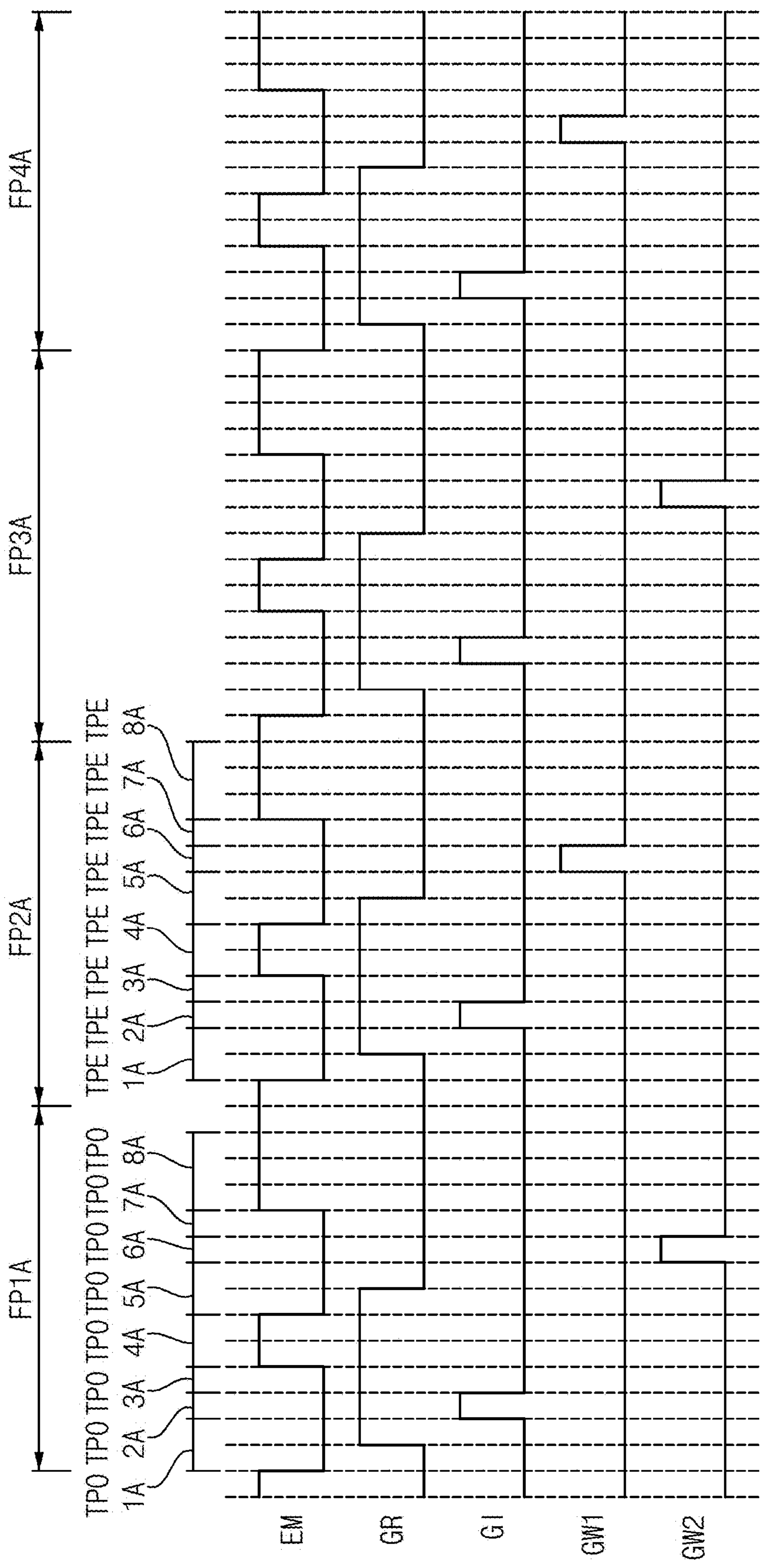
FIG. 3 is a timing diagram illustrating an example of an input signal applied to the pixel of FIG. 2.

FIG. 3 is a timing diagram illustrating an example of an input signal applied to the pixel circuit 111 of FIG. 2.

Referring to FIG. 3, the pixel circuit 111 of a pixel may be driven during a plurality of odd-numbered frame periods FP1A, FP3A and a plurality of even-numbered frame periods FP2A, FP4A.

Each of the odd-numbered frame periods FP1A, FP3A may include an odd frame initialization holding period TPO1A, an odd frame initialization period TPO2A, an odd frame compensation holding period TPO3A, an odd frame compensation period TPO4A, an odd frame writing holding period TPO5A, an odd frame writing period TPO6A, an odd frame emitting holding period TPO7A and an odd frame emitting period TPO8A.

Referring to FIG. 3, in the odd frame initialization holding period TPO1A, the emission signal EM may have an inactivation level (e.g., a first logic level), the control gate signal GR may change from an inactivation level to an activation level (e.g., a second logic level different from the first logic level), the initialization gate signal GI may have an inactivation level, the first write gate signal GW1 may have an inactivation level and the second write gate signal GW2 may have an inactivation level. The pixel circuit 111 may include N-type transistors. Accordingly, an activation level of the initialization gate signal GI, the control gate signal GR, the first write gate signal GW1 and the second write gate signal GW2 may be a high level. Also, an inactivation level of the initialization gate signal GI, the control gate signal GR, the first write gate signal GW1 and the second write gate signal GW2 may be a low level lower than the high level. In another embodiment, when the pixel circuit 111 includes P-type transistors, an activation level of the initialization gate signal GI, the control gate signal GR, the first write gate signal GW1 and the second write gate signal GW2 may be the low level. Also, when the pixel circuit 111 include P-type transistors, an inactivation level of the initialization gate signal GI, the control gate signal GR, the first write gate signal GW1 and the second write gate signal GW2 may be the high level.

When the emission signal EM has an inactivation level in the odd frame initialization holding period TPO1A, the fifth transistor T5 and the tenth transistor T10 may be turned off. When the first write signal GW1 and the second write signal GW2 have an inactivation level in the odd frame initialization holding period TPO1A, the second transistor T2 and the seventh transistor T7 may be turned off. Additionally, when the control gate signal GR changes to an activation level in the odd frame initialization holding period TPO1A, the third transistor T3 and the eighth transistor T8 may be turned on. Accordingly, the reference voltage VREF may be applied to the first node N1 and the fourth node N4. For example, the voltage of the first node N1 and a voltage of the fourth node N4 may be the reference voltage VREF.

In the odd frame initialization period TPO2A, the emission signal EM may have an inactivation level, the control gate signal GR may have an activation level, the initialization gate signal GI may have an activation level, the first write gate signal GW1 may have an inactivation level and the second write gate signal GW2 may have an inactivation level.

When the initialization gate signal GI has an activation level in the odd frame initialization period TPO2A, the fourth transistor T4 and the ninth transistor T9 may be turned on. Accordingly, the initialization voltage VINT may be applied to the third node N3 and the sixth node N6. For example, a voltage of the third node N3 and a voltage of the sixth node N6 may be the initialization voltage VINT. For example, the operation in which the initialization voltage VINT is applied to the third node N3 may be referred to as an initialization operation or a light emitting element initialization operation. For example, the operation in which the initialization voltage VINT is applied to the sixth node N6 may be referred to as the initialization operation or the light emitting element initialization operation.

In the odd frame compensation holding period TPO3A, the emission signal EM may have an inactivation level, the control gate signal GR may have an activation level, the initialization gate signal GI may have an inactivation level, the first write gate signal GW1 may have an inactivation level and the second write gate signal GW2 may have an inactivation level.

In the odd frame compensation holding period TPO3A, the fourth transistor T4 and the ninth transistor T9 may be turned off. Accordingly, the voltage of the first node N1 may maintain the reference voltage VREF. Also, the voltage of the fourth node N4 may maintain the reference voltage VREF. Also, the voltage of the third node N3 may maintain the initialization voltage VINT. Also, the voltage of the sixth node N6 may maintain the initialization voltage VINT.

In the odd frame compensation period TPO4A, the emission signal EM may have an activation level, the control gate signal GR may have an activation level, the initialization gate signal GI may have an inactivation level, the first write gate signal GW1 may have an inactivation level and the second write gate signal GW2 may have an inactivation level.

Since the emission signal EM may have an activation level in the odd frame compensation period TPO4A, the first transistor T1, the fifth transistor T5, the sixth transistor T6 and the tenth transistor T10 may be turned on. Accordingly, the voltage of the third node N3 may be a first compensation voltage. For example, the first compensation voltage may be a value obtained by subtracting a threshold voltage VTH1 of the first transistor T1 from a voltage of the first control electrode of the first transistor T1. For example, the first compensation may be a value of VREF-VTH1. Also, the voltage of the sixth node N6 may be a second compensation voltage. For example, the second compensation voltage may be a value obtained by subtracting a threshold voltage VTH6 of the sixth transistor T6 from a voltage of the first control electrode of the sixth transistor T6. For example, the second compensation may be a value of VREF-VTH6. For example, an operation in which the third node N3 has the first compensation voltage in response to the first transistor T1 and the fifth transistor T5 may be referred to as a compensation operation or a first compensation operation. For example, an operation in which the sixth node N6 has the second compensation voltage in response to the sixth transistor T6 and the tenth transistor T10 may be referred to as the compensation operation or a second compensation operation.

In the odd frame writing holding period TPO5A, the emission signal EM may have an inactivation level, the control gate signal GR may change from an activation level to an inactivation level, the initialization gate signal GI may have an inactivation level, the first write gate signal GW1 may have an inactivation level and the second write gate signal GW2 may have an inactivation level.

When the emission signal EM has an inactivation level in the odd frame writing holding period TPO5A, the fifth transistor T5 and the tenth transistor T10 may be turned off. When the control gate signal GR changes from an activation level to an inactivation level, the third transistor T3 and the eighth transistor T8 may be turned off.

In the odd frame writing period TPO6A, the emission signal EM may have an inactivation level, the control gate signal GR may have an inactivation level, the initialization gate signal GI may have an inactivation level, the first write gate signal GW1 may have an inactivation level and the second write gate signal GW2 may have an activation level.

When the first write gate signal GW1 has an inactivation level in the odd frame writing period TPO6A, the second transistor T2 may be turned off. Accordingly, the voltage of the first node N1 and the voltage of the third node N3 may be maintained.

Since the second write gate signal GW2 may have an activation level in the odd frame writing period TPO6A, the seventh transistor T7 may be turned on. Accordingly, the data voltage VDATA may be applied to the fourth node N4. For example, the voltage of the fourth node N4 may be the data voltage VDATA. Also, due to a bootstrapping of the second storage capacitor CST2, the voltage of the sixth node N6 may be an odd frame final write voltage. For example, the odd frame final write voltage may be VREF−VTH+(CST2C/(CST2C+CHOLD2C))*(VDATA−VREF). In this case, CST2C refers to a capacitance of the second storage capacitor CST2 and CHOLD2C refers to a capacitance of the second holding capacitor CHOLD2. For example, the odd frame final write voltage may be referred to as an odd frame data.

In the odd frame emitting holding period TPO7A, the emission signal EM may have an inactivation level, the control gate signal GR may have an inactivation level, the initialization gate signal GI may have an inactivation level, the first write gate signal GW1 may have an inactivation level and the second write gate signal GW2 may have an inactivation level.

When the first write gate signal GW1 and the second write gate signal GW2 have an inactivation level in the odd frame emitting holding period TPO7A, the voltage of the first node N1, the voltage of the third node N3, the voltage of the fourth node N4 and the voltage of the sixth node N6 may be maintained.

In the odd frame emitting period TPO8A, the emission signal EM may have an activation level, the control gate signal GR may have an inactivation level, the initialization gate signal GI may have an inactivation level, the first write gate signal GW1 may have an inactivation level and the second write gate signal GW2 may have an inactivation level.

The emission signal EM may have an activation level in the odd frame emitting period TPO8A. The second control electrode of the first transistor T1 may have the voltage of the third node N3. For example, the voltage of the third node N3 may be VREF-VTH1. Accordingly, the first transistor T1 may be turned off. Accordingly, the first subpixel SPX1A should not emit light in the odd frame emitting period TPO8A.

When the emission signal EM has an activation level in the odd frame emitting period TPO8A, the tenth transistor T10 may be turned on. The second control electrode of the sixth transistor T6 may have the voltage of the sixth node N6. For example, the voltage of the sixth node N6 may be the odd frame final write voltage. Accordingly, the sixth transistor T6 may apply the second driving current based on the odd frame final write voltage to the second light emitting element EE2. Accordingly, the second light emitting element EE2 may emit light. For example, the second subpixel SPX2A may emit light based on the current odd frame data.

Each of the even-numbered frame periods FP2A, FP4A may include an even frame initialization holding period TPE1A, an even frame initialization period TPE2A, an even frame compensation holding period TPE3A, an even frame compensation period TPE4A, an even frame writing holding period TPE5A, an even frame writing period TPE6A, an even frame emitting holding period TPE7A and an even frame emitting period TPE8A.

Referring to FIG. 3, in the even frame initialization holding period TPE1A, the emission signal EM may have an inactivation level, the control gate signal GR may change from an inactivation level to an activation level, the initialization gate signal GI may have an inactivation level, the first write gate signal GW1 may have an inactivation level and the second write gate signal GW2 may have an inactivation level.

When the emission signal EM has an inactivation level in the even frame initialization holding period TPE1A, the fifth transistor T5 and the tenth transistor T10 may be turned off. When the first write signal GW1 and the second write signal GW2 have an inactivation level in the even frame initialization holding period TPE1A, the second transistor T2 and the seventh transistor T7 may be turned off. Additionally, when the control gate signal GR changes to an activation level in the even frame initialization holding period TPE1A, the third transistor T3 and the eighth transistor T8 may be turned on. Accordingly, the reference voltage VREF may be applied to the first node N1 and the fourth node N4. For example, the voltage of the first node N1 and the voltage of the fourth node N4 may be the reference voltage VREF.

In the even frame initialization period TPE2A, the emission signal EM may have an inactivation level, the control gate signal GR may have an activation level, the initialization gate signal GI may have an activation level, the first write gate signal GW1 may have an inactivation level and the second write gate signal GW2 may have an inactivation level.

When the initialization gate signal GI has an activation level in the even frame initialization period TPE2A, the fourth transistor T4 and the ninth transistor T9 may be turned on. Accordingly, the initialization voltage VINT may be applied to the third node N3 and the sixth node N6. For example, the voltage of the third node N3 and the voltage of the sixth node N6 may be the initialization voltage VINT.

In the even frame compensation holding period TPE3A, the emission signal EM may have an inactivation level, the control gate signal GR may have an activation level, the initialization gate signal GI may have an inactivation level, the first write gate signal GW1 may have an inactivation level and the second write gate signal GW2 may have an inactivation level.

In the even frame compensation holding period TPE3A, the fourth transistor T4 and the ninth transistor T9 may be turned off. Accordingly, the voltage of the first node N1 may maintain the reference voltage VREF. Also, the voltage of the fourth node N4 may maintain the reference voltage VREF. Also, the voltage of the third node N3 may maintain the initialization voltage VINT. Also, the voltage of the sixth node N6 may maintain the initialization voltage VINT.

In the even frame compensation period TPE4A, the emission signal EM may have an activation level, the control gate signal GR may have an activation level, the initialization gate signal GI may have an inactivation level, the first write gate signal GW1 may have an inactivation level and the second write gate signal GW2 may have an inactivation level.

When the emission signal EM has an activation level in the even frame compensation period TPE4A, the fifth transistor T5 and the tenth transistor T10 may be turned on. Accordingly, the voltage of the third node N3 may be the first compensation voltage. Also, the voltage of the sixth node N6 may be the second compensation voltage.

In the even frame writing holding period TPE5A, the emission signal EM may have an inactivation level, the control gate signal GR may change from an activation level to an inactivation level, the initialization gate signal GI may have an inactivation level, the first write gate signal GW1 may have an inactivation level and the second write gate signal GW2 may have an inactivation level.

When the emission signal EM has an inactivation level in the even frame writing holding period TPE5A, the fifth transistor T5 and the tenth transistor T10 may be turned off. Also, when the control gate signal GR changes from an activation level to an inactivation level, the third transistor T3 and the eighth transistor T8 may be turned off.

In the even frame writing period TPE6A, the emission signal EM may have an inactivation level, the control gate signal GR may have an inactivation level, the initialization gate signal GI may have an inactivation level, the first write gate signal GW1 may have an activation level and the second write gate signal GW2 may have an inactivation level.

When the first write gate signal GW1 has an activation level in the even frame writing period TPE6A, the second transistor T2 may be turned on. Accordingly, the data voltage VDATA may be applied to the first node N1. For example, the voltage of the first node N1 may be the data voltage VDATA. Also, due to a bootstrapping of the first storage capacitor CST1, the voltage of the third node N3 may be an even frame final write voltage. For example, the even frame final write voltage may be VREF−VTH+(CST1C/(CST1C+CHOLD1C))*(VDATA−VREF). In this case, CST1C refers to a capacitance of the first storage capacitor CST1 and CHOLD1C refers to a capacitance of the first holding capacitor CHOLD1. For example, the even frame final write voltage may be referred to as even frame data.

When the second write gate signal GW2 has an inactivation level in the even frame writing period TPE6A, the seventh transistor T7 may be turned off. Accordingly, the voltage of the fourth node N4 may be maintained. Also, the voltage of the sixth node N6 may be maintained.

In the even frame emitting holding period TPE7A, the emission signal EM may have an inactivation level, the control gate signal GR may have an inactivation level, the initialization gate signal GI may have an inactivation level, the first write gate signal GW1 may have an inactivation level and the second write gate signal GW2 may have an inactivation level.

When the first write gate signal GW1 and the second write gate signal GW2 have an inactivation level in the even frame emitting holding period TPE7A, the voltage of the first node N1, the voltage of the third node N3, the voltage of the fourth node N4 and the voltage of the sixth node N6 may be maintained.

In the even frame emitting period TPE8A, the emission signal EM may have an activation level, the control gate signal GR may have an inactivation level, the initialization gate signal GI may have an inactivation level, the first write gate signal GW1 may have an inactivation level and the second write gate signal GW2 may have an inactivation level.

The emission signal EM may have an activation level in the even frame emitting period TPE8A. Accordingly, the fifth transistor T5 may be turned on. The second control electrode of the first transistor T1 may have the voltage of the third node N3. For example, the voltage of the third node N3 may be the even frame final write voltage. Accordingly, the first transistor T1 may apply the first driving current based on the even frame final write voltage to the first light emitting element EE1. Accordingly, the first light emitting element EE1 may emit light. For example, the first subpixel SPX1A may emit light based on the current even frame data.

The emission signal EM may have an activation level in the even frame emitting period TPE8A. The second control electrode of the sixth transistor T6 may have the voltage of the sixth node N6. For example, the voltage of the sixth node N6 may be VREF-VTH6. Accordingly, the sixth transistor T6 may be turned off. Accordingly, the second subpixel SPX2A should not emit in the even frame emitting period TPE8A.

Referring to FIG. 2 and FIG. 3, in this embodiment, the first subpixel SPX1A includes the first light emitting element EE1 and the second subpixel SPX2A includes the second light emitting element EE2. In an embodiment, the first viewing angle of the first light emitting element EE1 and the second viewing angle of the second light emitting element EE2 are different from one another. Accordingly, one of the first subpixel SPX1A and the second subpixel SPX2A may be the private mode subpixel and the remaining one may be the public mode subpixel. In an embodiment, the emission signal EM applied to the first subpixel SPX1A and the second subpixel SPX2A are the same. Accordingly, a public mode area and a private mode area may be arbitrarily disposed on an part of the display panel 100. The first write gate signal GW1 may be applied to the first subpixel SPX1A and the second write gate signal GW2 may be applied to the second subpixel SPX2A. In an embodiment, a timing of the first write gate signal GW1 and a timing of the second write gate signal GW2 are different from one another. Accordingly, the public mode area and the private mode area may be distinguished according to image data.

In an embodiment, the display apparatus 101 may operate the public mode or the private mode. When the display apparatus 101 operates in the public mode, a signal of FIG. 3 may be applied to the pixel circuit 111. When the display apparatus 101 operates in the private mode, the second write gate signal GW2 may be maintained at the inactivation level in a frame period. Accordingly, the second data writing operation should not be performed. Also, the second subpixel SPX2A (e.g., the public mode subpixel) should not emit light.

Figure 4:
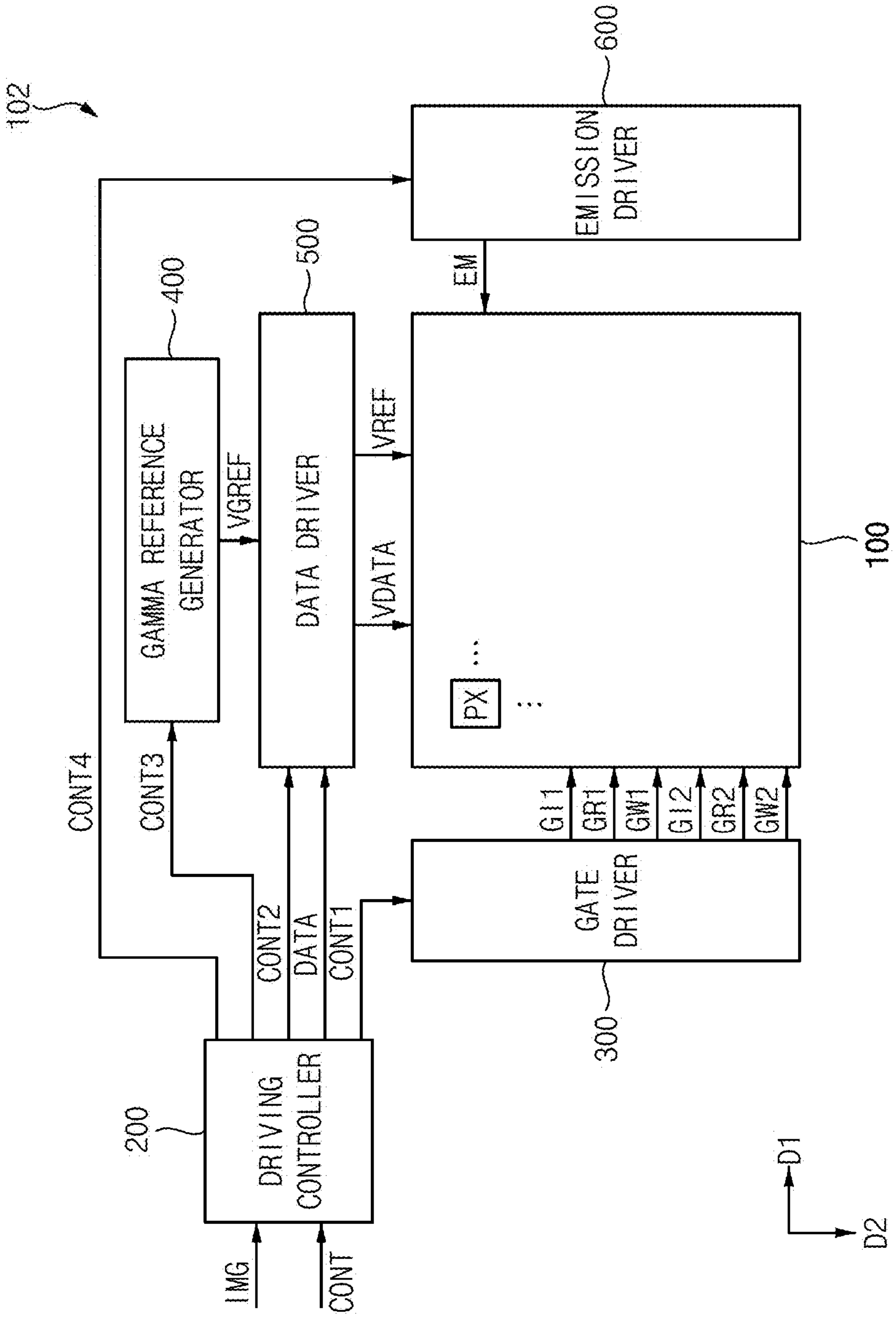
FIG. 4 is a block diagram illustrating a display apparatus according to an embodiment of the present inventive concept.

FIG. 4 is a block diagram illustrating a display apparatus 102 according to an embodiment of the present inventive concept.

Referring to FIG. 4, since a display apparatus 102 according to this embodiment is substantially identical to the display apparatus 101 of FIG. 1, respectively, except that the initialization gate signal GI includes a first initialization gate signal GI1 and a second initialization gate signal GI2, the control gate signal GR includes a first control gate signal GR1 and a second control signal GR2, the first initialization gate signal GI1 and the first control gate signal GR1 may be applied to a first subpixel SPX1B and the second initialization gate signal GI2 and the second control gate signal GR2 may be applied to a second subpixel SPX2B. Thus, the same reference numerals will be used to refer to the same and any repetitive explanation concerning the above elements will be omitted.

Figure 5:
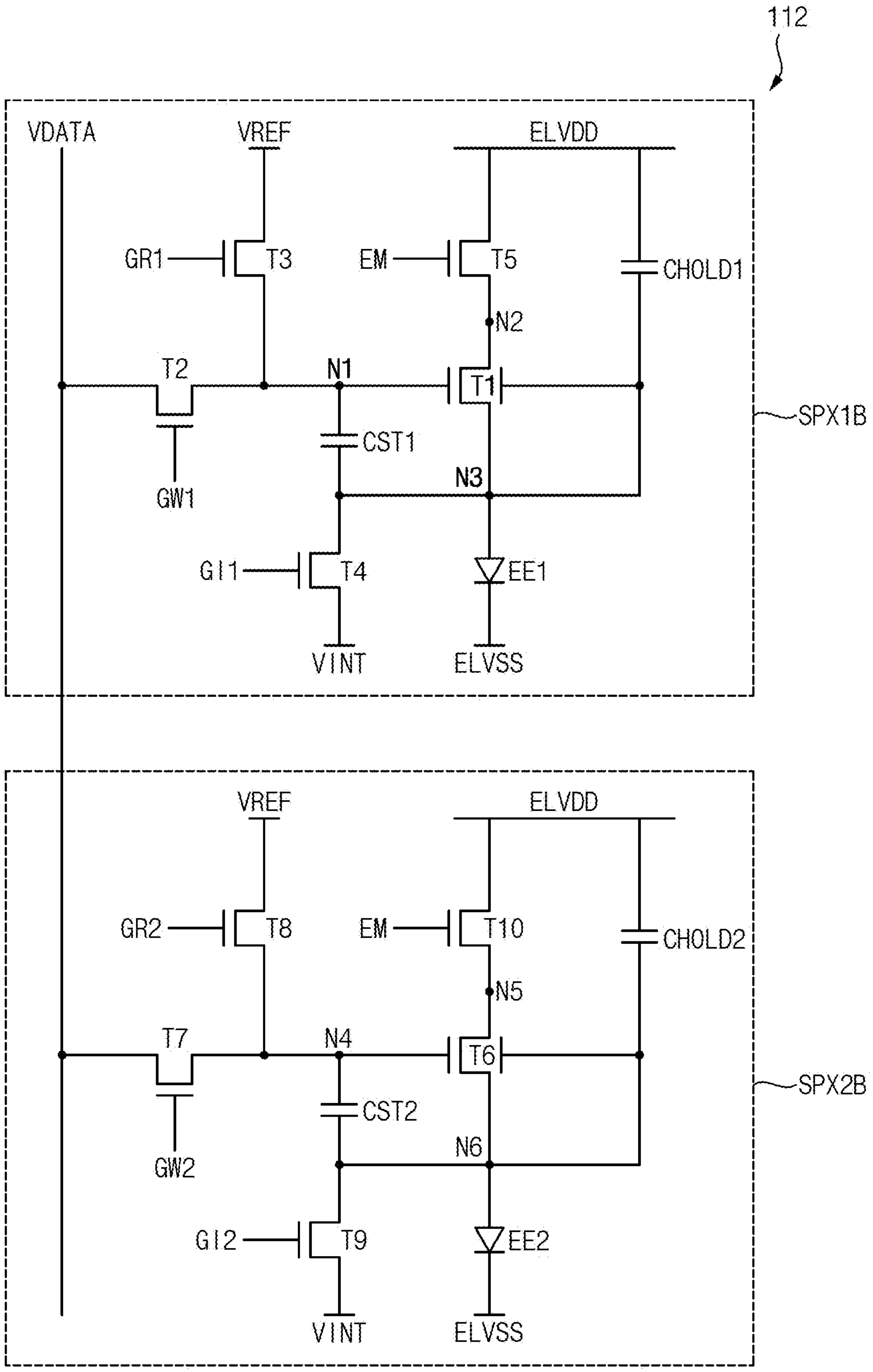
FIG. 5 is a circuit diagram illustrating a pixel circuit of a pixel of the display apparatus of FIG. 4.

FIG. 5 is a circuit diagram illustrating a pixel circuit 112 of a pixel PX of the display apparatus 102 of FIG. 4 according to an embodiment.

Referring to FIG. 5, the pixel circuit 112 may include the first subpixel SPX1B and the second subpixel SPX2B.

Referring to FIG. 5, since the pixel circuit 112 according to this embodiment is substantially identical to the pixel circuit 111 of FIG. 2, respectively, except that the first control gate signal GR1 is applied to the control node of the third transistor T3, the first initialization gate signal GI1 is applied to the control node of the fourth transistor T4, the second control gate signal GR2 is applied to the control node of the eighth transistor T8 and the second initialization gate signal GI2 is applied to the control node of the ninth transistor T9. Thus, the same reference numerals will be used to refer to the same and any repetitive explanation concerning the above elements will be omitted.

Figure 6:
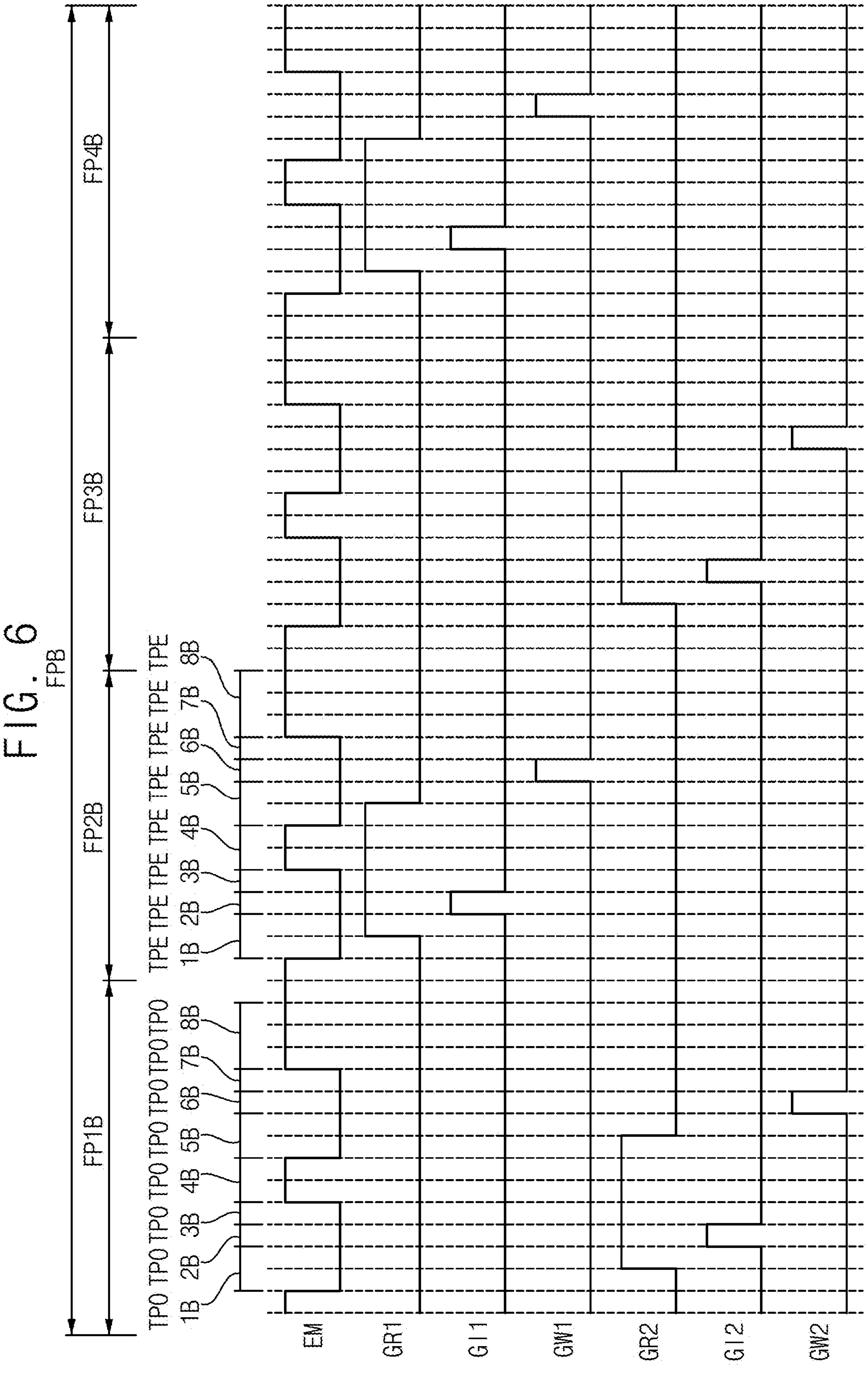
FIG. 6 is a timing diagram illustrating an example of an input signal applied to the pixel circuit of FIG. 5.

FIG. 6 is a timing diagram illustrating an example of an input signals applied to the pixel circuit 112 of FIG. 5.

Referring to FIG. 6, the pixel circuit 112 is driven during a plurality of odd-numbered frame periods FP1B, FP3B and a plurality of even-numbered frame periods FP2B, FP4B.

Each of the odd-numbered frame periods FP1B, FP3B may include an odd frame initialization holding period TPO1B, an odd frame initialization period TPO2B, an odd frame compensation holding period TPO3B, an odd frame compensation period TPO4B, an odd frame writing holding period TPO5B, an odd frame writing period TPO6B, an odd frame emitting holding period TPO7B and an odd frame emitting period TPO8B.

Referring to FIG. 6, in the odd frame initialization holding period TPO1B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level and the second write gate signal GW2 may have an inactivation level. The pixel circuit 112 may include N-type transistors. Accordingly, an activation level of the first initialization gate signal GI1, the first initialization gate signal GI1, the first control gate signal GR1, the second control gate signal GR2, the first write gate signal GW1 and the second write gate signal GW2 may be a high level. Also, an inactivation level of the first initialization gate signal GI1, the first initialization gate signal GI1, the first control gate signal GR1, the second control gate signal GR2, the first write gate signal GW1 and the second write gate signal GW2 may be a low level lower than the high level. In another embodiment, when the pixel circuit 112 includes P-type transistors, an activation level of the first initialization gate signal GI1, the first initialization gate signal GI1, the first control gate signal GR1, the second control gate signal GR2, the first write gate signal GW1 and the second write gate signal GW2 may be the low level. Also, when the pixel circuit 112 include P-type transistors, an inactivation level of the first initialization gate signal GI1, the first initialization gate signal GI1, the first control gate signal GR1, the second control gate signal GR2, the first write gate signal GW1 and the second write gate signal GW2 may be the high level.

When the emission signal EM has an inactivation level in the odd frame initialization holding period TPO1B, the fifth transistor T5 and the tenth transistor T10 may be turned off. When the first write signal GW1 and the second write signal GW2 have an inactivation level in the odd frame initialization holding period TPO1B, the second transistor T2 and the seventh transistor T7 may be turned off. Additionally, when the second control gate signal GR2 changes to an activation level in the odd frame initialization holding period TPO1B, the eighth transistor T8 may be turned on. Accordingly, the reference voltage VREF may be applied to the fourth node N4. For example, the voltage of the fourth node N4 may be the reference voltage VREF.

When the first control gate signal GR1 and the first initialization gate signal GI1 are maintained at an inactivation level in the odd frame initialization holding period TPO1B, the voltage of the first node N1 and the voltage of the third node N3 may have a voltage of a previous frame (e.g., a voltage of a previous even frame). For example, the voltage of the first node N1 may be the data voltage VDATA of the previous even frame and the voltage of the third node N3 may be the even frame final write voltage of the previous even frame. For example, the even frame final write voltage of the previous even frame may be VREF−VTH+(CST1C/(CST1C+CHOLD1C))*(VDATA−VREF).

In the odd frame initialization period TPO2B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an activation level, the second initialization gate signal GI2 may have an activation level, and the second write gate signal GW2 may have an inactivation level.

When the second initialization gate signal GI2 has an activation level in the odd frame initialization period TPO2B, the ninth transistor T9 may be turned on. Accordingly, the initialization voltage VINT may be applied to the sixth node N6. For example, the voltage of the sixth node N6 may be the initialization voltage VINT.

When the first control gate signal GR1 and the first initialization gate signal GI1 are maintained at an inactivation level in the odd frame initialization period TPO2B, the voltage of the first node N1 and the voltage of the third node N3 may have a voltage of a previous frame (e.g., a voltage of a previous even frame). For example, the voltage of the first node N1 may be the data voltage VDATA of the previous even frame and the voltage of the third node N3 may be the even frame final write voltage of the previous even frame. For example, the even frame final write voltage of the previous even frame may be VREF−VTH+(CST1C/(CST1C+CHOLD1C))*(VDATA−VREF).

In the odd frame compensation holding period TPO3B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an activation level, the second initialization gate signal GI2 may have an inactivation level, and the second write gate signal GW2 may have an inactivation level.

In the odd frame compensation holding period TPO3B, the ninth transistor T9 may be turned off. Accordingly, the voltage of the fourth node N4 may maintain the reference voltage VREF. Also, the voltage of the sixth node N6 may maintain the initialization voltage VINT.

When the first control gate signal GR1 and the first initialization gate signal GI1 are maintained at an inactivation level in the odd frame compensation holding period TPO3B, the voltage of the first node N1 and the voltage of the third node N3 may have a voltage of a previous frame (e.g., a voltage of a previous even frame). For example, the voltage of the first node N1 may be the data voltage VDATA of the previous even frame and the voltage of the third node N3 may be the even frame final write voltage of the previous even frame. For example, the even frame final write voltage of the previous even frame may be VREF−VTH+(CST1C/(CST1C+CHOLD1C))*(VDATA−VREF).

In the odd frame compensation period TPO4B, the emission signal EM may have an activation level, the first control gate signal GR1 may have an inactivation level, the first initialization gate signal GI1 may have an inactivation level, the first write gate signal GW1 may have an inactivation level, the second control gate signal GR2 may have an activation level, the second initialization gate signal GI2 may have an inactivation level, and the second write gate signal GW2 may have an inactivation level.

When the emission signal EM has an activation level in the odd frame compensation period TPO4B, the tenth transistor T10 may be turned on. Accordingly, the voltage of the sixth node N6 may be the second compensation voltage. For example, the second compensation voltage may be a value obtained by subtracting a threshold voltage of the sixth transistor VTH6 from a voltage of the first control electrode of the sixth transistor T6. For example, the second compensation may be a value of VREF-VTH6.

When the emission signal EM has an activation level in the odd frame compensation period TPO4B, the fifth transistor T5 may be turned on. The second control electrode of the first transistor T1 may have the voltage of the third node N3. Accordingly, the first transistor T1 may apply the first driving current based on the even frame final write voltage to the first light emitting element EE1. Accordingly, the first light emitting element EE1 may emit light.

In the odd frame writing holding period TPO5B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may change from an activation level to an inactivation level, the second initialization gate signal GI2 may have an inactivation level, and the second write gate signal GW2 may have an inactivation level.

When the emission signal EM has an inactivation level in the odd frame writing holding period TPO5B, the fifth transistor T5 may be turned off. Also, when the first control gate signal GR1 changes from an activation level to an inactivation level, the third transistor T3 and the eighth transistor T8 may be turned off.

When the first control gate signal GR1 and the first initialization gate signal GI1 are maintained at an inactivation level in the odd frame writing holding period TPO5B, the voltage of the first node N1 and the voltage of the third node N3 may have a voltage of the previous frame (e.g., a voltage of the previous even frame). For example, the voltage of the first node N1 may be the data voltage VDATA of the previous even frame and the voltage of the third node N3 may be the even frame final write voltage of the previous even frame. For example, the even frame final write voltage of the previous even frame may be VREF−VTH+(CST1C/(CST1C+CHOLD1C))*(VDATA−VREF).

In the odd frame writing period TPO6B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an activation level.

When the second write gate signal GW2 has an activation level in the odd frame writing period TPO6B, the seventh transistor T7 may be turned on. Accordingly, the data voltage VDATA may be applied to the fourth node N4. For example, the voltage of the fourth node N4 may be the data voltage VDATA. Also, due to a bootstrapping of the second storage capacitor CST2, the voltage of the sixth node N6 may be the odd frame final write voltage. For example, the odd frame final write voltage may be VREF−VTH+(CST2C/(CST2C+CHOLD2C))*(VDATA−VREF).

When the first write gate signal GW1 has an inactivation level in the odd frame writing period TPO6B, the second transistor T2 may be turned off. Accordingly, the voltage of the first node N1 and the voltage of the third node N3 may be maintained. For example, the voltage of the third node N3 may be the even frame final write voltage of the previous even frame. For example, the even frame final write voltage of the previous even frame may be VREF−VTH+(CST1C/(CST1C+CHOLD1C))*(VDATA−VREF).

In the odd frame emitting holding period TPO7B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the first write gate signal GW1 and the second write gate signal GW2 have an inactivation level in the odd frame emitting holding period TPO7B, the voltage of the first node N1, the voltage of the third node N3, the voltage of the fourth node N4 and the voltage of the sixth node N6 may be maintained.

In the odd frame emitting period TPO8B, the emission signal EM may have an activation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the emission signal EM has an activation level in the odd frame emitting period TPO8B, the tenth transistor T10 may be turned on. The second control electrode of the sixth transistor T6 may have the voltage of the sixth node N6. For example, the voltage of the sixth node N6 may be the odd frame final write voltage. Accordingly, the sixth transistor T6 may apply the second driving current based on the odd frame final write voltage to the second light emitting element EE2. Accordingly, the second light emitting element EE2 may emit light.

The emission signal EM may have an activation level in the odd frame emitting period TPO8B. Accordingly, the fifth transistor T5 may be turned on. The second control electrode of the first transistor T1 may have the voltage of the third node N3. For example, the voltage of the third node N3 may be the even frame final write voltage. Accordingly, the first transistor T1 may apply the first driving current based on the even frame final write voltage to the first light emitting element EE1. Accordingly, the first light emitting element EE1 may emit light.

Each of the even-numbered frame periods FP2B, FP4B may include an even frame initialization holding period TPE1B, an even frame initialization period TPE2B, an even frame compensation holding period TPE3B, an even frame compensation period TPE4B, an even frame writing holding period TPE5B, an even frame writing period TPE6B, an even frame emitting holding period TPE7B and an even frame emitting period TPE8B.

In the even frame initialization holding period TPE1B, the emission signal EM may have an inactivation level, the first control gate signal GR1 may change from an inactivation level to activation level, the first initialization gate signal GI1 may have an inactivation level, the first write gate signal GW1 may have an inactivation level, the second control gate signal GR2 may have an inactivation level, the second initialization gate signal GI2 may have an inactivation level and the second write gate signal GW2 may have an inactivation level.

When the emission signal EM has an inactivation level in the even frame initialization holding period TPE1B, the fifth transistor T5 and the tenth transistor T10 may be turned off. When the first write signal GW1 and the second write signal GW2 have an inactivation level in the even frame initialization holding period TPE1B, the second transistor T2 and the seventh transistor T7 may be turned off. Additionally, when the first control gate signal GR1 changes to an activation level in the even frame initialization holding period TPO1B, the third transistor T3 may be turned on. Accordingly, the reference voltage VREF may be applied to the first node N1. For example, the voltage of the first node N1 may be the reference voltage VREF.

When the second control gate signal GR2 and the second initialization gate signal GI2 are maintained at an inactivation level in the even frame initialization holding period TPE1B, the voltage of the fourth node N4 and the voltage of the sixth node N6 may have a voltage of a previous frame (e.g. a voltage of a previous odd frame). For example, the voltage of the fourth node N4 may be the data voltage VDATA of the previous odd frame and the voltage of the sixth node N6 may be the odd frame final write voltage of the previous odd frame. For example, the odd frame final write voltage of the previous odd frame may be VREF−VTH+(CST2C/(CST2C+CHOLD2C))*(VDATA−VREF).

In the even frame initialization period TPE2B, the emission signal EM may have an inactivation level, the first control gate signal GR1 may have an activation level, the first initialization gate signal GI1 may have an activation level, the first write gate signal GW1 may have an inactivation level, the second control gate signal GR2 may have an inactivation level, the second initialization gate signal GI2 may have an inactivation level, and the second write gate signal GW2 may have an inactivation level.

When the first initialization gate signal GI1 has an activation level in the even frame initialization period TPE2B, the fourth transistor T4 may be turned on. Accordingly, the initialization voltage VINT may be applied to the third node N3. For example, the voltage of the third node N3 may be the initialization voltage VINT.

When the second control gate signal GR2 and the second initialization gate signal GI2 are maintained at an inactivation level in the even frame initialization period TPE2B, the voltage of the fourth node N4 and the voltage of the sixth node N6 may have a voltage of the previous frame (e.g. a voltage of the previous odd frame). For example, the voltage of the fourth node N4 may be the data voltage VDATA of the previous odd frame and the voltage of the sixth node N6 may be the odd frame final write voltage of the previous odd frame. For example, the odd frame final write voltage of the previous odd frame may be VREF−VTH+(CST2C/(CST2C+CHOLD2C))*(VDATA−VREF).

In the even frame compensation holding period TPE3B, the emission signal EM may have an inactivation level, the first control gate signal GR1 may have an activation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

In the even frame compensation holding period TPE3B, the fourth transistor T4 may be turned off. Accordingly, the voltage of the first node N1 may maintain the reference voltage VREF. Also, the voltage of the third node N3 may maintain the initialization voltage VINT.

When the second control gate signal GR2 and the second initialization gate signal GI2 are maintained at an inactivation level in the even frame compensation holding period TPE3B, the voltage of the fourth node N4 and the voltage of the sixth node N6 may have a voltage of a previous frame (e.g. a voltage of a previous odd frame). For example, the voltage of the fourth node N4 may be the data voltage VDATA of the previous odd frame and the voltage of the sixth node N6 may be the odd frame final write voltage of the previous odd frame. For example, the odd frame final write voltage of the previous odd frame may be VREF−VTH+(CST2C/(CST2C+CHOLD2C))*(VDATA−VREF).

In the even frame compensation period TPE4B, the emission signal EM may have an activation level, the first control gate signal GR1 may have an activation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the emission signal EM has an activation level in the even frame compensation period TPE4B, the fifth transistor T5 may be turned on. Accordingly, the voltage of the third node N3 may be the first compensation voltage. For example, the first compensation voltage may be a value obtained by subtracting a threshold voltage VTH1 of the first transistor T1 from a voltage of the first control electrode of the first transistor T1. For example, the first compensation may be a value of VREF−VTH1.

When the emission signal EM has an activation level in the even frame compensation period TPE4B, the tenth transistor T10 may be turned on. The second control electrode of the sixth transistor T6 may have the voltage of the sixth node N6. Accordingly, the sixth transistor T6 may apply the second driving current based on the odd frame final write voltage to the second light emitting element EE2. Accordingly, the second light emitting element EE2 may emit light.

In the even frame writing holding period TPE5B, the emission signal EM may have an inactivation level, the first control gate signal GR1 may change from an activation level to an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the emission signal EM has an inactivation level in the even frame writing holding period TPE5B, the fifth transistor T5 may be turned off. Also, when the first control gate signal GR1 changes from an activation level to an inactivation level, the third transistor T3 may be turned off.

When the emission signal EM has an inactivation level in the even frame writing holding period TPE5B, the tenth transistor T10 may be turned off. Also, when the second control gate signal GR2 and the second initialization gate signal GI2 are maintained at an inactivation level in the even frame writing holding period TPE5B, the voltage of the fourth node N4 and the voltage of the sixth node N6 may have a voltage of the previous frame (e.g. a voltage of the previous odd frame). For example, the voltage of the fourth node N4 may be the data voltage VDATA of the previous odd frame and the voltage of the sixth node N6 may be the odd frame final write voltage of the previous odd frame. For example, the odd frame final write voltage of the previous odd frame may be VREF−VTH+(CST2C/(CST2C+CHOLD2C))*(VDATA−VREF).

In the even frame writing period TPE6B, the emission signal EM may have an inactivation level, the first control gate signal GR1 may have an inactivation level, the first initialization gate signal GI1 may have an inactivation level, the first write gate signal GW1 may have an activation level, the second control gate signal GR2 may have an inactivation level, the second initialization gate signal GI2 may have an inactivation level, and the second write gate signal GW2 may have an inactivation level.

When the first write gate signal GW1 has an activation level in the even frame writing period TPE6B, the second transistor T2 may be turned on. Accordingly, the data voltage VDATA may be applied to the first node N1. For example, the voltage of the first node N1 may be the data voltage VDATA. Also, due to a bootstrapping of the first storage capacitor CST1, the voltage of the third node N3 may be the even frame final write voltage. For example, the even frame final write voltage may be VREF−VTH+(CST1C/(CST1C+CHOLD1C))*(VDATA−VREF).

When the second write gate signal GW2 has an inactivation level in the even frame writing period TPE6B, the seventh transistor T7 may be turned off. Accordingly, the voltage of the fourth node N4 and the voltage of the sixth node N6 may be maintained. For example, the voltage of the sixth node N6 may be the odd frame final write voltage of the previous odd frame. For example, the odd frame final write voltage of the previous odd frame may be VREF−VTH+(CST2C/(CST2C+CHOLD2C))*(VDATA−VREF).

In the even frame emitting holding period TPE7B, the emission signal EM may have an inactivation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the first write gate signal GW1 and the second write gate signal GW2 have an inactivation level in the even frame emitting holding period TPE7B, the voltage of the first node N1, the voltage of the third node N3, the voltage of the fourth node N4 and the voltage of the sixth node N6 may be maintained.

In the even frame emitting period TPE8B, the emission signal EM may have an activation level, the first control gate signal GR1 may have an inactivation level, the first initialization gate signal GI1 may have an inactivation level, the first write gate signal GW1 may have an inactivation level, the second control gate signal GR2 may have an inactivation level, the second initialization gate signal GI2 may have an inactivation level, and the second write gate signal GW2 may have an inactivation level.

When the emission signal EM has an activation level in the even frame emitting period TPE8B, the fifth transistor T5 may be turned on. The second control electrode of the first transistor T1 may have the voltage of the third node N3. For example, the voltage of the third node N3 may be the even frame final write voltage. Accordingly, the first transistor T1 may apply the first driving current based on the even frame final write voltage to the first light emitting element EE1. Accordingly, the first light emitting element EE1 may emit light. For example, the first subpixel SPX1A may emit light based on the current even frame data.

The emission signal EM may have an activation level in the even frame emitting period TPE8B. Accordingly, the tenth transistor T10 may be turned on. The second control electrode of the sixth transistor T6 may have the voltage of the sixth node N6. For example, the voltage of the sixth node N6 may be the odd frame final write voltage. Accordingly, the sixth transistor T6 may apply the second driving current based on the odd frame final write voltage to the second light emitting element EE2. Accordingly, the second light emitting element EE2 may emit light.

Referring to FIG. 4 and FIG. 5, in this embodiment, the first subpixel SPX1B includes the first light emitting element EE1 and the second subpixel SPX2B includes the second light emitting element EE2. In an embodiment, the first viewing angle of the first light emitting element EE1 and the second viewing angle of the second light emitting element EE2 are different from one another. Accordingly, one of the first subpixel SPX1B and the second subpixel SPX2B may be the private mode subpixel and the remaining one may be the public mode subpixel.

In an embodiment, the emission signal EM applied to the first subpixel SPX1B and the second subpixel SPX2B are the same. Accordingly, a public mode area and a private mode area may be arbitrarily disposed on various regions of the display panel 100. For example, rather than having fixed areas of the display panel as the public mode area and the private mode area, these areas can be dynamically configured with various sizes and locations. The first write gate signal GW1 may be applied to the first subpixel SPX1B and the second write gate signal GW2 may be applied to the second subpixel SPX2B. Also, in an embodiment, the timing of the first write gate signal GW1 and the timing of the second write gate signal GW2 are different from one another. Accordingly, the public mode area and the private mode area may be distinguished from one another according to image data. Additionally, the second subpixel SPX2B may emit light based on the odd frame final write voltage in the even frame compensation period TPE4B and the even frame emitting period TPE8B. Also, the first subpixel SPX1B may emit light based on the even frame final write voltage in the odd frame compensation period TPO4B and the odd frame emitting period TPO8B. A display apparatus in which the public mode and the private mode is separated may operate using time division driving with an emission time reduced to 50%. However, at least one embodiment of the present inventive concept may emit light by maintaining the value of the previous frame. Accordingly, luminance control of the pixel circuit 112 may be increased.

In an embodiment, the display apparatus 102 operates in the public mode or the private mode. When the display apparatus 102 operates in the public mode, a signal of FIG. 6 may be applied to the pixel circuit 112. In an embodiment when the display apparatus 102 operates in the private mode, the second write gate signal GW2 is maintained at the inactivation level in a frame period. Accordingly, the second data writing operation should not be performed. Also, the second subpixel SPX2B (e.g., the public mode subpixel) should not emit light.

Figure 7:
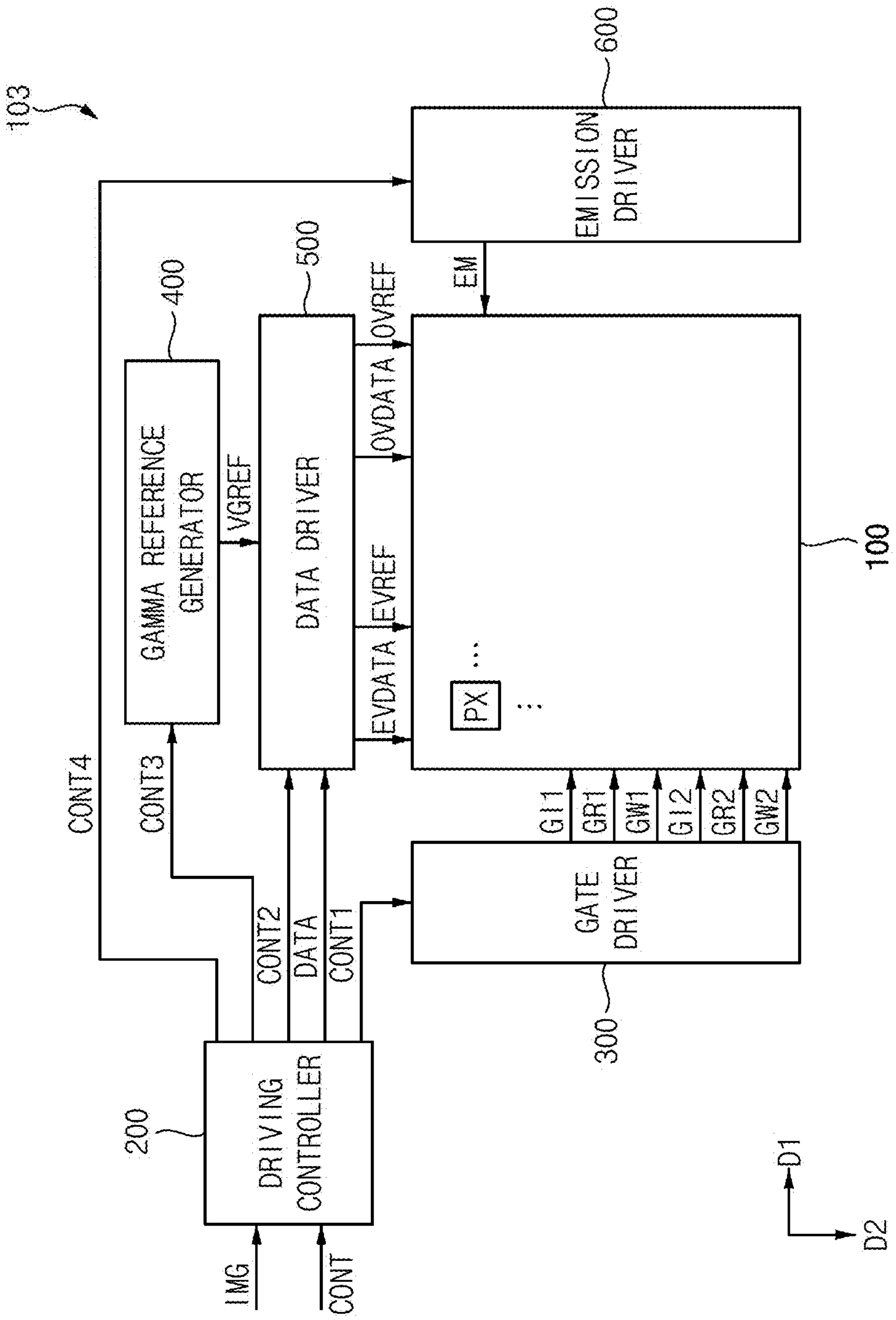
FIG. 7 is a block diagram illustrating a display apparatus according to an embodiment of the present inventive concept.
Figure 8:
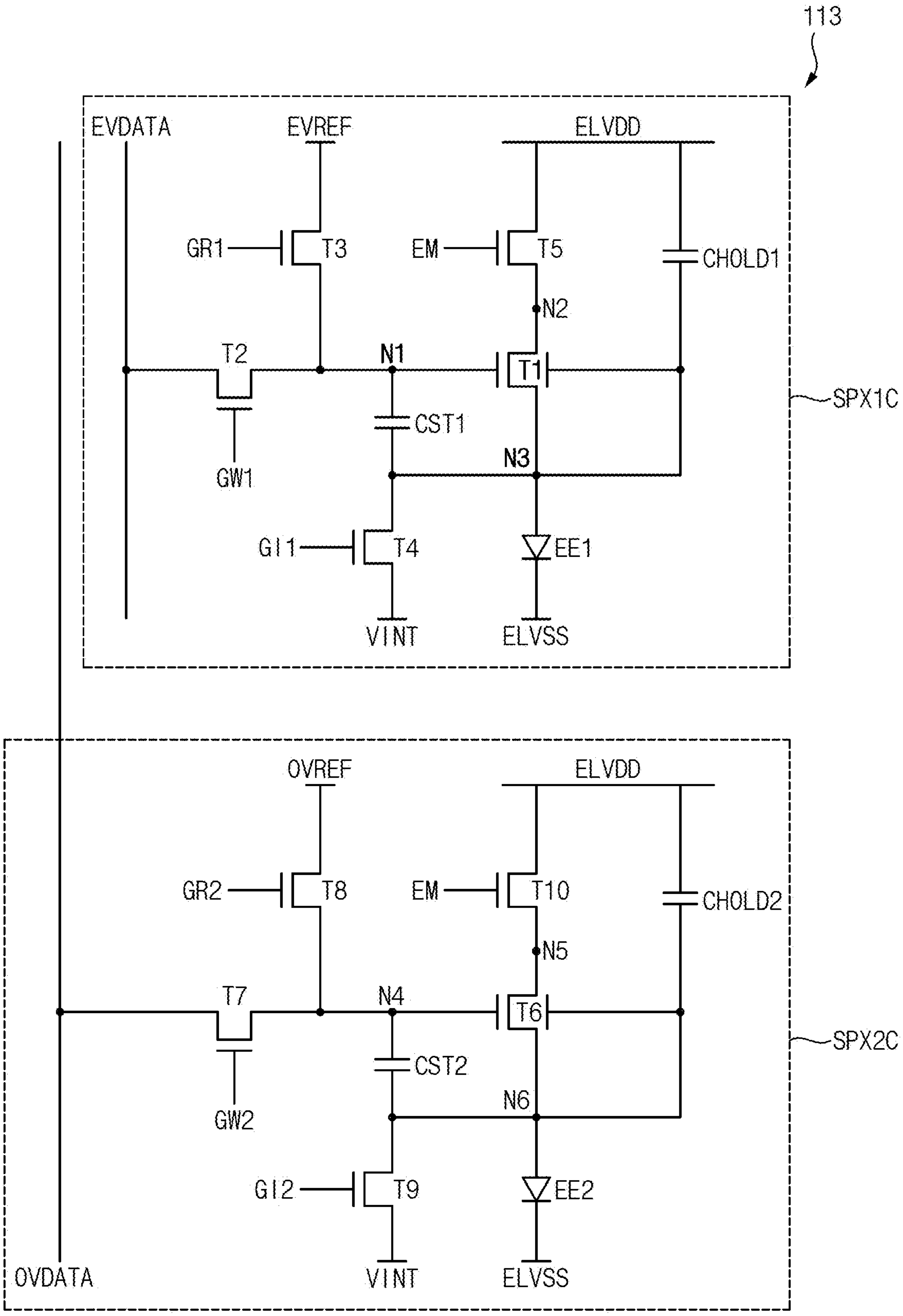
FIG. 8 is a circuit diagram illustrating a pixel circuit of a pixel of the display apparatus of FIG. 7 according to an embodiment of the present inventive concept.

FIG. 7 is a block diagram illustrating a display apparatus 103 according to an embodiment of the present inventive concept. FIG. 8 is a circuit diagram illustrating a pixel circuit 113 of a pixel PX of the display apparatus 103 of FIG. 7.

Referring to FIG. 7, the pixel circuit 113 may include a first subpixel SPX1C and a second subpixel SPX2C. Since a display apparatus 103 according to this embodiment is substantially identical to the display apparatus 102 of FIG. 4, respectively, except that the data driver 500 applies a first data voltage OVDATA (e.g., an odd data voltage) and a first reference voltage OVREF (e.g., an odd reference voltage) to the second subpixel SPX2C and the data driver 500 applies a second data voltage EVDATA (e.g., an even data voltage) and a second reference voltage EVREF (e.g., an even reference voltage) to the first subpixel SPX1C. Thus, the same reference numerals will be used to refer to the same and any repetitive explanation concerning the above elements will be omitted.

Referring to FIG. 8, since the pixel circuit 113 according to this embodiment is substantially identical to the pixel circuit 112 of FIG. 5, respectively, except that the first electrode of the second transistor T2 is applied with the second data voltage EVDATA, the first electrode of the third transistor T3 is applied with the second reference voltage EVREF, the first electrode of the seventh transistor T7 is applied with the first data voltage OVDATA and the first electrode of the eighth transistor T8 is applied with the first reference voltage OVREF. Thus, the same reference numerals will be used to refer to the same and any repetitive explanation concerning the above elements will be omitted. In an embodiment, the first data voltage OVDATA and the first reference voltage OVREF are applied during an odd frame period and the second data voltage EVDATA and the second reference voltage EVREF are applied during an even frame period. In an embodiment, the first reference voltage OVREF is different from the second reference voltage EVREF.

Referring to FIG. 7 and FIG. 8, the data driver 500 applies the first data voltage OVDATA, the first reference voltage OVREF, the second data voltage EVDATA and the second reference voltage EVREF to the pixel circuit 113. Accordingly, a more optimal luminance control of the pixel circuit 113 may be achieved.

Figure 9:
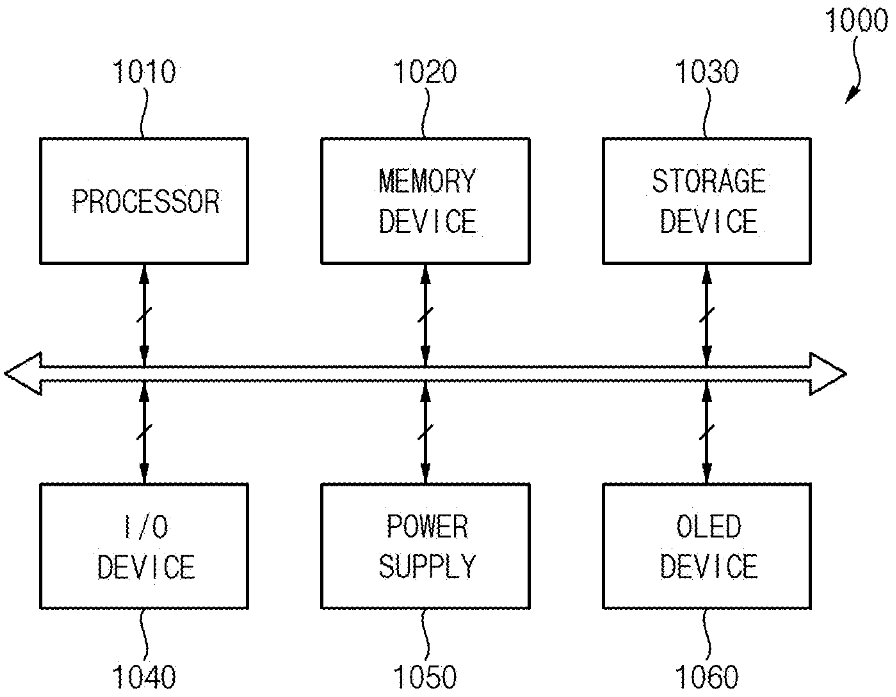
FIG. 9 is a block diagram illustrating an electronic device according to an embodiment of the present inventive concept.
Figure 10:
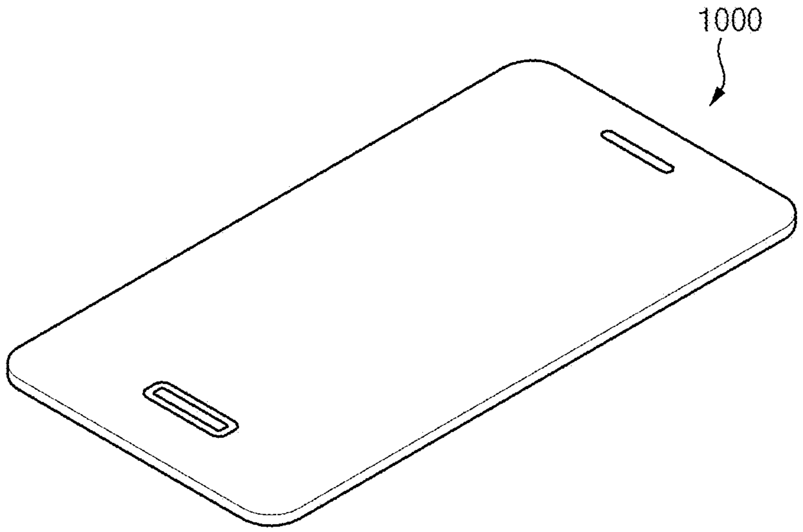
FIG. 10 is a view illustrating an example in which the electronic device of FIG. 9 is implemented as a smart phone.

FIG. 9 is a block diagram illustrating an electronic device according to an embodiment of the present inventive concept. FIG. 10 is a view illustrating an example in which the electronic device of FIG. 9 is implemented as a smart phone.

Referring to FIGS. 9 and 10, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1, FIG. 4 or FIG. 7. In addition, the electronic apparatus 1000 may further include a plurality of ports for communicating with a video card, a sound card, a memory card, a universal serial bus (USB) device, other electronic apparatuses, etc.

According to an embodiment, as shown in FIG. 10, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet personal computer (PC), a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1, FIG. 4 or FIG. 7.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via buses or other communication links.

A pixel according to at least one embodiment may include a first subpixel and a second subpixel receiving different write gate signals, so that each of the subpixels may be a public mode subpixel or a private mode subpixel. Since the write gate signal may be applied to the subpixels according to image data and the same emission signal may be applied to the subpixels, a public mode area and a private mode area may be arbitrarily disposed in various region of the display panel of the display apparatus. Accordingly, the positions where the public mode area and the private mode area are displayed in the display panel of the display apparatus may be dynamically changed according to the image data.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the present inventive concept. Accordingly, all such modifications are intended to be included within the scope of the present inventive concept as defined in the claims.

What is claimed is:

1. A display apparatus comprising:

a display panel including a first subpixel, and a second subpixel having a viewing angle different from a viewing angle of the first subpixel;

a data driver configured to apply a data voltage and a reference voltage to the display panel;

a gate driver configured to apply a control gate signal, an initialization gate signal, a first write gate signal and a second write gate signal to the display panel;

an emission driver configured to apply emission signals to the display panel; and a driving controller configured to control the data driver, the gate driver and the emission driver, wherein the first subpixel and the second subpixel are configured to receive a same one of the emission signals, wherein, in a current frame period, a data writing operation is performed on a given pixel among the first subpixel and the second subpixel while being skipped for the other, and in a next frame period, the data writing operation is performed on the other subpixel while being skipped for the given pixel.

2. The display apparatus of claim 1, wherein a data writing operation is not performed on the first subpixel in an odd frame writing period of an odd-numbered frame period and the data writing operation is performed on the second subpixel in the odd frame writing period.

3. The display apparatus of claim 2, wherein an initialization operation is performed on the first subpixel in an odd frame initialization period of the odd-numbered frame period, and wherein a compensation operation is performed on the first subpixel in an odd frame compensation period of the odd-numbered frame period.

4. The display apparatus of claim 3, wherein a data writing operation is not performed on the second subpixel in an even frame writing period of an even-numbered frame period and the data writing operation is performed on the first subpixel in an even frame writing period of the even-numbered frame period.

5. The display apparatus of claim 4, wherein in the even frame emitting period, the second subpixel emits light based on a previous odd frame data and the first subpixel emits light based on a current even frame data.

6. The display apparatus of claim 5, wherein an initialization operation is performed on the second subpixel in an even frame initialization period of the even-numbered frame period, and wherein a compensation operation is performed on the second subpixel in an even frame compensation period of the even-numbered frame period.

7. The display apparatus of claim 6, wherein in the even frame emitting period, the second subpixel does not emit light and the first subpixel emits light based on a current even frame data.

8. The display apparatus of claim 3, wherein in the odd frame emitting period, the first subpixel does not emit light and the second subpixel emits light based on current odd frame data.

9. The display apparatus of claim 2, wherein in an odd frame emitting period of the odd-numbered frame period, the first subpixel emits light based on previous even frame data and the second subpixel emits light based on current odd frame data.

10. The display apparatus of claim 1, wherein the first subpixel comprises a first light emitting element, a first transistor configured to apply a first driving current to the first light emitting element, a second transistor configured to apply a data voltage to the first transistor in response to a first write gate signal, and a fifth transistor configured to apply a first power supply voltage to the first transistor in response to an emission signal, wherein the second subpixel comprises a second light emitting element having a viewing angle different from a viewing angle of the first light emitting element, a sixth transistor configured to apply a second driving current to the second light emitting element, a seventh transistor configured to apply the data voltage to the sixth transistor in response to a second write gate signal different from the first write gate signal, and a tenth transistor configured to apply the first power supply voltage to the sixth transistor in response to the emission signal.

11. The display apparatus of claim 10, wherein the first subpixel comprises:

the first transistor including a first control electrode connected to a first node, a second control electrode connected to a third node, a first electrode connected to a second node and a second electrode connected to the third node;

the second transistor including a control electrode configured to receive the first write gate signal, a first electrode configured to receive the data voltage and a second electrode connected to the first node;

a third transistor including a control electrode configured to receive a control gate signal, a first electrode configured to receive a reference voltage and a second electrode connected to the first node;

a fourth transistor including a control electrode configured to receive an initialization gate signal, a first electrode configured to receive an initialization voltage and a second electrode connected to the third node;

a first storage capacitor including a first electrode connected to the third node and a second electrode connected to the first node;

a first holding capacitor including a first electrode configured to receive the first power supply voltage and a second electrode connected to the third node; and the first light emitting element, and wherein the second subpixel comprises:

the sixth transistor including a first control electrode connected to a fourth node, a second control electrode connected to a sixth node, a first electrode connected to a fifth node and a second electrode connected to the sixth node;

the seventh transistor including a control electrode configured to receive the second write gate signal, a first electrode configured to receive the data voltage and a second electrode connected to the fourth node;

an eighth transistor including a control electrode configured to receive the control gate signal, a first electrode configured to receive the reference voltage and a second electrode connected to the fourth node;

a ninth transistor including a control electrode configured to receive the initialization gate signal, a first electrode configured to receive the initialization voltage and a second electrode connected to the sixth node;

a tenth transistor including a control electrode configured to receive the emission signal, a first electrode configured to receive the first power supply voltage and a second electrode connected to the fifth node;

a second storage capacitor including a first electrode connected to the sixth node and a second electrode connected to the fourth node;

a second holding capacitor including a first electrode configured to receive the first power supply voltage and a second electrode connected to the sixth node; and the second light emitting element.

12. The display apparatus of claim 1, wherein the first subpixel is a private mode subpixel having a first viewing angle, and wherein the second subpixel is a public mode subpixel having a second viewing angle wider than the first viewing angle.

13. The display apparatus of claim 1, wherein the display apparatus operates in a private mode or a public mode, and wherein, in the private mode, a data writing operation is not performed on the second subpixel in a frame period.

14. The display apparatus of claim 1, wherein the data driver applies a first data voltage and a first reference voltage to the first subpixel, and the data driver applies a second data voltage different from the first data voltage and a second reference voltage different from the first reference voltage to the second subpixel.

15. A pixel comprising:

a first subpixel including a first light emitting element, a first transistor configured to apply a first driving current to the first light emitting element, a second transistor configured to apply a data voltage to the first transistor in response to a first write gate signal, and a fifth transistor configured to apply a first power supply voltage to the first transistor in response to an emission signal; and a second subpixel including a second light emitting element having a viewing angle different from a viewing angle of the first light emitting element, a sixth transistor configured to apply a second driving current to the second light emitting element, a seventh transistor configured to apply the data voltage to the sixth transistor in response to a second write gate signal different from the first write gate signal, and a tenth transistor configured to apply the first power supply voltage to the sixth transistor in response to the emission signal.

16. The pixel of claim 15, wherein the first subpixel comprises:

the first transistor including a first control electrode connected to a first node, a second control electrode connected to a third node, a first electrode connected to a second node and a second electrode connected to the third node;

the second transistor including a control electrode configured to receive the first write gate signal, a first electrode configured to receive the data voltage and a second electrode connected to the first node;

a third transistor including a control electrode configured to receive a control gate signal, a first electrode configured to receive a reference voltage and a second electrode connected to the first node;

a fourth transistor including a control electrode configured to receive an initialization gate signal, a first electrode configured to receive an initialization voltage and a second electrode connected to the third node;

a first storage capacitor including a first electrode connected to the third node and a second electrode connected to the first node;

a first holding capacitor including a first electrode configured to receive the first power supply voltage and a second electrode connected to the third node; and the first light emitting element, and wherein the second subpixel comprises:

the sixth transistor including a first control electrode connected to a fourth node, a second control electrode connected to a sixth node, a first electrode connected to a fifth node and a second electrode connected to the sixth node;

the seventh transistor including a control electrode configured to receive the second write gate signal, a first electrode configured to receive the data voltage and a second electrode connected to the fourth node;

an eighth transistor including a control electrode configured to receive the control gate signal, a first electrode configured to receive the reference voltage and a second electrode connected to the fourth node;

a ninth transistor including a control electrode configured to receive the initialization gate signal, a first electrode configured to receive the initialization voltage and a second electrode connected to the sixth node;

a tenth transistor including a control electrode configured to receive the emission signal, a first electrode configured to receive the first power supply voltage and a second electrode connected to the fifth node;

a second storage capacitor including a first electrode connected to the sixth node and a second electrode connected to the fourth node;

a second holding capacitor including a first electrode configured to receive the first power supply voltage and a second electrode connected to the sixth node; and the second light emitting element.

17. The pixel of claim 16, wherein an odd-numbered frame period of the pixel comprises:

an odd frame initialization period in which the emission signal has an inactivation level, the control gate signal has an activation level, the initialization gate signal has an activation level, the first write gate signal has an inactivation level and the second write gate signal has an inactivation level;

an odd frame compensation period in which the emission signal has an activation level, the control gate signal has an activation level, the initialization gate signal has an inactivation level, the first write gate signal has an inactivation level and the second write gate signal has an inactivation level;

an odd frame writing period in which the emission signal has an inactivation level, the control gate signal has an inactivation level, the initialization gate signal has an inactivation level, the first write gate signal has an inactivation level and the second write gate signal has an activation level; and an odd frame emitting period in which the emission signal has an activation level, the control gate signal has an inactivation level, the initialization gate signal has an inactivation level, the first write gate signal has an inactivation level and the second write gate signal has an inactivation level, and wherein an even-numbered frame period of the pixel comprises:

an even frame initialization period in which the emission signal has an inactivation level, the control gate signal has an activation level, the initialization gate signal has an activation level, the first write gate signal has an inactivation level and the second write gate signal has an inactivation level;

an even frame compensation period in which the emission signal has an activation level, the control gate signal has an activation level, the initialization gate signal has an inactivation level, the first write gate signal has an inactivation level and the second write gate signal has an inactivation level;

an even frame writing period in which the emission signal has an inactivation level, the control gate signal has an inactivation level, the initialization gate signal has an inactivation level, the first write gate signal has an activation level and the second write gate signal has an inactivation level; and an even frame emitting period in which the emission signal has an activation level, the control gate signal has an inactivation level, the initialization gate signal has an inactivation level, the first write gate signal has an inactivation level and the second write gate signal has an inactivation level.

18. The pixel of claim 15, wherein the first subpixel is a private mode subpixel having a first viewing angle, and wherein the second subpixel is a public mode subpixel having a second viewing angle wider than the first viewing angle.

19. The pixel of claim 15, wherein the second transistor is turned off and the seventh transistor is turned on in an odd-numbered frame period.

20. The pixel of claim 15, wherein the second transistor is turned on and the seventh transistor is turned off in an even-numbered frame period.

21. An electronic device comprising:

a display panel including a plurality of pixels, where each of the pixels comprises a first subpixel and a second subpixel;

a gate driver configured to generate a first write gate signal and a second write gate different from the first write gate signal; and an emission driver configured to apply a plurality of emission signals to the display panel, wherein the first subpixel includes a first light emitting element having a first viewing angle, a first driving transistor, a first data write transistor configured to apply a data voltage to the first driving transistor in response to the first write gate signal, and a first emission control transistor configured to apply a power supply voltage to the first driving transistor in response to a first emission signal among the emission signals, and wherein the second subpixel includes a second light emitting element having a second viewing angle different from the first viewing angle, a second driving transistor configured to apply a second driving current to the second light emitting element, a second data write transistor configured to apply the data voltage to the second driving transistor in response to the second write gate signal, and an emission control transistor configured to apply the power supply voltage to the second driving transistor in response to the first emission signal.

* * * * *